US005426137A

United States Patent [19]

Allen

[11] Patent Number: 5,426,137

[45] Date of Patent: Jun. 20, 1995

[54] METHOD FOR CONTINUOUSLY MIXING FLUIDS

[75] Inventor: Thomas E. Allen, Comanche, Okla.

[73] Assignee: Halliburton Company, Duncan, Okla.

[21] Appl. No.: 241,730

[22] Filed: May 12, 1994

Related U.S. Application Data

[62] Division of Ser. No. 1,232, Jan. 5, 1993, Pat. No. 5,352,624.

[51] Int. Cl.⁶ .................... C08J 3/05; B01F 3/12

[52] U.S. Cl. .................... 523/318; 523/315; 523/319; 523/322; 528/502 E; 422/901; 366/165.2; 366/158.4; 366/178.3; 366/178.2

[58] Field of Search .................... 523/315, 318, 319, 322; 366/165, 182; 528/502; 422/901

[56] References Cited

U.S. PATENT DOCUMENTS

| | | | |
|---|---|---|---|
| 2,743,909 | 8/1953 | Lawlor | 259/42 |
| 4,077,612 | 3/1978 | Ricciardi | 366/102 |
| 4,184,771 | 1/1980 | Day | 366/3 |
| 4,336,145 | 6/1982 | Briscoe | 252/8.55 R |
| 4,453,829 | 6/1984 | Althouse, III | 366/13 |
| 4,466,890 | 8/1984 | Briscoe | 252/8.55 R |
| 4,764,019 | 8/1988 | Kaminski et al. | 366/15 |
| 4,772,646 | 9/1988 | Harms et al. | 524/27 |
| 4,779,186 | 10/1988 | Handke et al. | 364/172 |
| 4,828,034 | 5/1989 | Constien et al. | 166/308 |
| 4,830,505 | 5/1989 | Dunton et al. | 366/2 |
| 4,863,277 | 9/1989 | Neal et al. | 366/137 |
| 5,135,968 | 8/1992 | Brazelton et al. | 523/318 |

OTHER PUBLICATIONS

U.S. patent application Ser. No. 07/693,995; assigned to the Assignee of the present application, now issued into U.S. Pat. No. 5,190,374, Mar. 1993.

U.S. patent application Ser. No. 07/412,255; assigned to the Assignee of the present application, now issued into U.S. Pat. No. 5,046,855, Sep. 1991.

U.S. patent application Ser. No. 07/412,231; assigned to the Assignee of the present application, now issued into U.S. Pat. No. 5,114,239, May 19, 1992.

U.S. patent application Ser. No. 07/693,995, now U.S. Pat. No. 5,190,374, Mar. 2, 1993.

Bulletin 790 published in 1990 by Acrison, Inc.

Bulletin No. BJI-73-156 published by Byron Jackson, Inc., a subsidiary of Borg-Warner in Houston, Tex., Dec. 1992.

Article entitled "Integrated, Solid-Liquid Mixing System Wets Out Powders Without Forming Lumps," Berenstain et al., published in *Chemical Processing*, Mar., 1989.

(List continued on next page.)

*Primary Examiner*—Paul R. Michl
*Assistant Examiner*—Andrew E. C. Merriam
*Attorney, Agent, or Firm*—Stephen R. Christian; lawrence R. Watson

[57] ABSTRACT

Apparatus and method of hydrating a particulated polymer and producing a well treatment gel includes a mixer for spraying the polymer with water at a substantially constant water velocity and at a substantially constant water spray pattern at all flow rates of the water. A centrifugal diffuser is connected to the mixer for receiving the mixture, centrifugally diffusing the motive energy of the mixture, and hydrating the mixture into a gel. A centrifugal separator and constant velocity jet pump may be connected between the mixer and the centrifugal diffuser. A dilution valve is connected to the discharge of the centrifugal diffuser for mixing water with the gel at a substantially constant mixing energy at all flow rates of the gel and producing a diluted gel. A viscometer may be connected to the discharge of the dilution valve for measuring the viscosity of the diluted gel and regulating the flow of gel from the centrifugal diffuser to the dilution valve in order to control the viscosity of the diluted gel.

24 Claims, 12 Drawing Sheets

OTHER PUBLICATIONS

Undated brochure entitled "the RAM-Recirculating Averaging Mixer for Consistent Slurry Weight" published by BJ-Titan; Bulletin.

BJ/ABZ/002 of BJ Hughes entitled "Dual RAM-Dual Recirculating Averaging Mixer," Dec. 1992.

Halliburton Sales & Service Catalog No. 43 published in 1985, p. 2416.

American Chemical Society Symposium Series 396, *Oil-Field Chemistry Enhanced Recovery and Production Stimulation,* section entitled "Dispersion of Gelling Agents," Chapter 2, pp. 72–74, Application of Chemistry in Oil and Gas Well Fracturing, 1989, written by Weldon M. Harmes.

Society of Petroleum Engineers Paper No. SPE 17535, "Diesel-Based Gel Concentrate Improves Rocky Mountain Region Fracture Treatments," presented at the SPE Rocky Mountain Regional Meeting held in Casper, Syoming, May 11–13, 1988.

Article entitled "Turbulent Mixing at High Dilution Ratio in a Sulzer-Koch Sttic Mixer" published in Ind. Eng. Chem. Process Des. Dev., 1986.

Undated brochure TSL-5011, "Precision Meets Dependability for the Perfect Mix" published by Dowell-Schlumberger, Dec. 1992.

"Western Offshore Cementing Services" published by the Western Company of North America, Dec. 1992.

Undated flyer MC0009, "The Magcobar Cementing System," Magcobar Division of Dresser Industries, Inc., Dec. 1992.

Article entitled "Powder/Liquid Mixing-It's Not Really Magic," CPI, Nov.-Dec., 1983.

"Feed System for Breaxit Polymers" demonstrated by representatives of Exxon Chemicals to employees of Halliburton Services on Apr. 4, 1989.

Halliburton Services ads entitled "To those who've been trying to imitate Halliburton LGC Systems for the past 11 years: Thanks for the compliment" and Oil--based LGC Systems-Two new ways to concentrate on wellsite economy, Dec. 1992.

Article entitled "Continuous mix technology adds new flexibility to frac jobs," *Oil & Gas Journal-Technology,* Jun. 6, 1988.

*Petroleum Engineer International,* Apr. 1988, pp. 51–54.

*SPE Production Engineering,* Nov. 1989, "Study of Continuously Mixed Crosslinked Fracturing Fluids With a Recirculating Flow-Loop Viscometer."

Society of Petroleum Engineers Paper No. SPE 18968, "Viscosity Measurement Throughout Frac Job Gives Increased Gel Control During Continuous Mixing" prepared for presentation at SPE Joint Rocky Mountain Regional/Low Permeability Reservoirs Symposium & Exhibition, Denver, Colo., Mar. 6–8, 1989.

METHOD FOR CONTINUOUSLY MIXING FLUIDS

This is a divisional of application Ser. No. 08/001,232 filed on Jan. 5, 1993, now U.S. Pat. No. 5,352,624.

BACKGROUND OF THE INVENTION

The present invention relates to the mixing of polymer gel agents and water to form a well treatment fluid, such as a fracturing or acidizing gel, and more particularly, but not by way of limitation, to a method and apparatus for continuously mixing such gels on a real time basis.

High viscosity aqueous fluids, such as fracturing gels, acidizing gels, and high density completion fluids, are commonly used in the oil industry in treating subterranean wells. These gels are normally made using dry polymer additives or agents which are mixed with water or other aqueous fluids at the job site. The mixing procedures which have been used have inherent problems. For example, the earliest "batch" mixing procedures involved mixing bags of the polymer in tanks at the job site. This created problems such as uneven and inaccurate mixing, lumping of the powder into insoluble "gel balls" or "fish eyes" which obstructed the flow of the gel, chemical dust hazards, etc.

A known method of solving the lumping, gel ball problem is to delay hydration long enough for the individual polymer particles to disperse and become surrounded by water so that no dry particles are trapped inside a gelled coating to form a gel ball. This delay is achieved by coating the polymer with material such as borate salts, glyoxal, non-lumping HEC, sulfosuccinate, metallic soaps, surfactants, or other materials of opposite surface charge to the polymer.

Another known way to improve the efficiency of polymer addition to water and derive the maximum yield from the polymer is to prepare a stabilized polymer slurry ("SPS"), also referred to as a liquid gel concentrate ("LGC"). The liquid gel concentrate is premixed and then later added to the water. In Briscoe U.S. Pat. No. 4,336,145, assigned to the assignee of the present invention, a liquid gel concentrate is disclosed comprising water, the polymer or polymers, and an inhibitor having a property of reversibly reacting with the hydratable polymer in a manner wherein the rate of hydration of the polymer is retarded. Upon a change in the pH condition of the concentrate such as by dilution and/or the addition of a buffering agent (pH changing chemical) to the concentrate, upon increasing the temperature of the concentrate, or upon a change of other selected condition of the concentrate, the inhibition reaction is reversed, and the polymer or polymers hydrate to yield the desired viscosified fluid. This reversal of the inhibition of the hydration of the gelling agent in the concentrate may be carried out directly in the concentrate or later when the concentrate is combined with additional water. The aqueous-based liquid gel concentrate of Briscoe has worked well at eliminating gel balls and is still in routine use in the industry. However, aqueous concentrates can suspend only a limited quantity of polymer due to the Physical swelling and viscosification that occurs in a water-based medium. Typically, about 0.8 pounds of polymer can be suspended per gallon of the concentrate.

By using a hydrocarbon carrier fluid, rather than water, higher quantities of solids can be suspended. For example, up to about five pounds of polymer may be suspended in a gallon of diesel fuel carrier. Such a liquid gel concentrate is disclosed in Harms and Norman U.S. Pat. No. 4,722,646, assigned to the assignee of the present invention. Such hydrocarbon-based liquid gel concentrates work well but require a suspension agent such as an organophylic clay or certain polyacrylate agents. The hydrocarbon-based liquid gel concentrate is later mixed with water in a manner similar to that for aqueous-based liquid gel concentrates to yield a viscosified fluid, but hydrocarbon-based concentrates have the advantage of holding more polymer.

An additional problem with prior methods using liquid gel concentrates occurs in offshore and remote locations. The service vehicles utilized to supply the offshore and remote locations have a limited storage capacity and often must return to their source to replenish their supply of concentrate before they are able to complete large jobs or do additional jobs, particularly when the liquid gel concentrate is water-based. Therefore, it would be desirable to be able to continuously mix a well treatment gel during the actual treatment of the subterranean formation from dry ingredients. For example, such an on-line system could satisfy the fluid flow requirements for large hydraulic fracturing jobs during the actual fracturing of the subterranean formation by continuously mixing the fracturing gel.

One method and apparatus for continuously mixing a fracturing gel is disclosed in Constien et al. U.S. Pat. No. 4,828,034, in which a fracturing fluid slurry concentrate is mixed through a static mixer device 3 on a real time basis and the slurry is flowed through baffled tanks 4, 7 in a first-in first-out flow pattern to produce a fully hydrated fracturing fluid during the actual fracturing operation. This process utilizes a hydrophobic solvent which is characterized by a hydrocarbon such as diesel, as in the hydrocarbon-based liquid gel concentrates described above.

Recently, however, there have been problems with hydrocarbon-based liquid gel concentrates. Some well operators object to the presence of hydrocarbon fluids, such as diesel, even though the hydrocarbon represents a relatively small amount of the total fracturing gel once mixed with water. Also, there are environmental problems associated with the clean-up and disposal of both hydrocarbon-based concentrates and well treatment gels containing hydrocarbons; as well as with the clean-up of the tanks, piping, and other handling equipment which have been contaminated by the hydrocarbon-based gel. These hydrocarbon-related problems apply to the process of Constien et al.

Accordingly, there is a need for a process to produce a well treatment gel in which relatively higher amounts of polymer per unit volume can be utilized while eliminating the environmental problems and objections related to hydrocarbon-based concentrates. There is also a need for apparatus and method to produce a well treatment gel substantially continuously during the well treatment operation to overcome the storage capacity problems discussed above.

U.S. patent application Ser. No. 07/693,995, now Harms et al. U.S. Pat. No. 5,190,374, which is incorporated herein by reference thereto for purposes of disclosure, assigned to the assignee of the present invention, discloses method and apparatus for substantially continuously producing a fracturing gel, without the use of hydrocarbons or suspension agents, by feeding the dry polymer into an axial flow mixer which uses a high mixing energy to wet the polymer during its initial contact with water. After initial mixing, additional water may be added to the mixer to increase the volume of water-polymer slurry produced thereby. In Harms et al., a predetermined quantity of hydratable polymer in a substantially particulate form is provided to a polymer or solids inlet of a water spraying mixer. A stream of water is supplied to a water inlet of the mixer and the water and polymer are mixed in the mixer to form a water-polymer mix prior to discharge from the mixer. The mixer is preferably mounted adjacent to the upper portion of a mixing or primary tank and an agitator may be provided in the mixing tank to further agitate and stir the slurry. The slurry may be transferred from the mixing tank to a holding or secondary tank after which it is discharged to the fracturing process. A high shear device may be disposed in the holding tank. A pump may be used for transferring the slurry from the mixing tank to the holding tank.

Although Harms et al. disclose an on-line mixing system which may be used with untreated and uncoated polymers, in practice there are problems with the Harms et al. mixing system. For example, the powder splatters inside the mixer, sticks to the walls of the mixer, and builds up, eventually choking flow through the mixer. The sequential opening of the water orifices in sets of six orifices inadequately wets the powder at low flow rates, and creates a spiral water spray pattern having a central iris or void through which unwetted powder can pass. Another problem is created by the entrainment of air in the fluid mixed in the mixer which impairs the ability of the pump to adequately pump the mixture from the mixer. Another problem is the creation of additional entrained air in the fluid in the holding tank by the discharge of the pump into the holding tank. The entrained air compels the use of deaerating chemicals with the system. Another problem is the lack of a controlled flow path and therefore the hydration time in the holding tank, i.e., the hydrating slurry can create unpredictable flow channels through the tank which cause non-uniform residence times of portions of the slurry in the tank. Another problem is the large lag time (5-10 minutes) involved in changing the viscosity of the gel discharged from the holding tank, i.e., the only way to alter the viscosity of the gel is to change the powder/water ratio at the mixer and therefore the fluid of "altered" viscosity must displace all of the fluid and gel between the mixer and the outlet of the holding tank before the viscosity at the outlet of the holding tank is altered.

Therefore, there is a need for an apparatus and method for hydrating a particulated polymer which will fully wet the dry polymer powder while reducing splattering and gel buildup inside the mixer; which will eliminate voids and openings in the water spray pattern through which unwetted powder can pass; which will reduce the entrainment of air in the polymer water mixture; which will eliminate the need for deaerating chemicals; which will provide for instantaneous adjustment of the viscosity of the produced gel; and which will do so continuously, i.e., which will wet the powder and produce the gel on-line as demanded by the gel user, thereby reducing the need for hydration tanks and other gel contacting containers at the job site.

SUMMARY OF THE INVENTION

The present invention is contemplated to overcome the foregoing deficiencies and meet the above-described needs. In accomplishing this, the present invention provides a novel and improved apparatus and method of hydrating a particulated polymer and producing a gel, such as a well treatment gel.

The invention includes mixing means for spraying the polymer with a water spray and forming a water-polymer mixture having a motive energy; and a centrifugal diffuser, connected to the mixing means, for receiving the mixture from the mixing means, centrifugally diffusing the motive energy of the mixture, and hydrating the mixture into a gel. The preferred mixing means is a water spraying induction mixer which sprays the polymer with water at a substantially constant water velocity and at a substantially constant water spray pattern at all flow rates of the water. The centrifugal diffuser includes an inner chamber, an outer chamber surrounding the inner chamber, and a hydration tank surrounding the outer chamber. The mixture is tangentially directed into the inner chamber and flows in a first-fluid-in, first-fluid-out flow regime circumferentially downward through the inner chamber, outward and circumferentially upward through the outer chamber, and circumferentially downward through the hydration tank to the outlet of the hydration tank. The flow path through the centrifugal diffuser provides sufficient residence time that the mixture hydrates into a gel. Preferably, the gel exits the centrifugal diffuser in a concentrated form. A dilution means is connected to an outlet of the centrifugal diffuser for mixing water with the concentrated gel and producing a diluted gel.

A viscometer may be connected to an outlet of the dilution means for measuring the viscosity of the diluted gel and producing a viscosity signal. Control means are provided for receiving the viscosity signal and adjusting the flow of gel from the centrifugal diffuser to the dilution means to adjust the viscosity of the diluted gel to a desired viscosity.

In a preferred embodiment, which is particularly suitable for applications in which it is necessary to limit the height of the overall apparatus, a separating means is provided which is connected to the mixing means for receiving the water-polymer mixture and separating air therefrom and a pump is connected to the separating means for imparting motive energy to the mixture and moving the mixture from the separating means to the centrifugal diffuser.

BRIEF DESCRIPTION OF THE DRAWINGS

The present invention will be better understood by reference to the example of the following drawings.

DETAILED DESCRIPTION OF THE PREFERRED EMBODIMENTS

Figure 1:
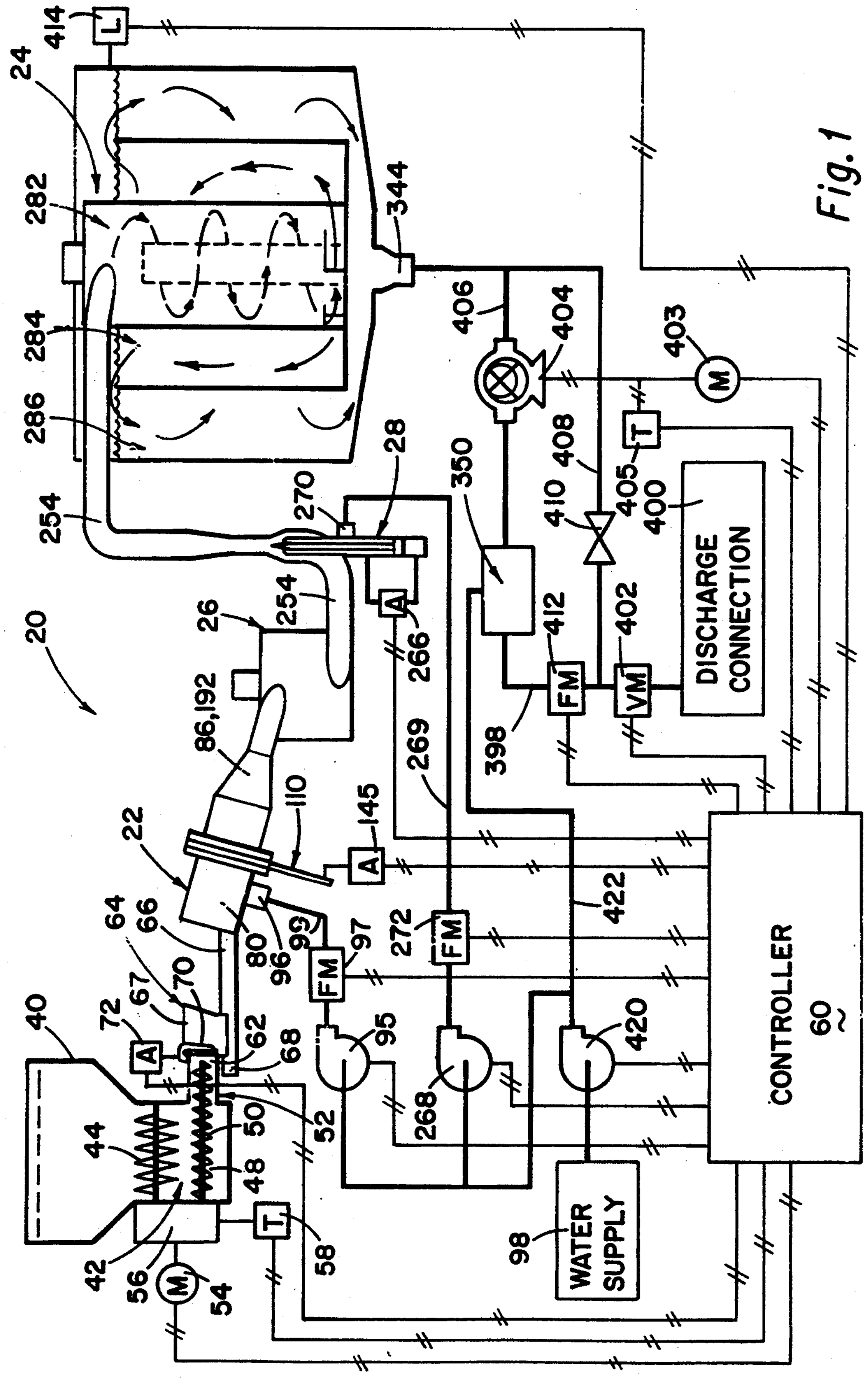
FIG. 1 is a schematic of an embodiment of the apparatus and method for continuously mixing fluids of the present invention.

Preferred embodiments of the invention will now be described with reference to the drawings, wherein like reference characters refer to like or corresponding parts throughout the drawings and description.

FIGS. 1–16 present embodiments of the apparatus and method of the present invention, generally designated 20, for continuously mixing fluids. Although the preferred embodiment, and the apparatus and method as described herein, is used for mixing and hydrating a particulate polymer and producing a gel used in treating subterranean wells, it is intended to be understood that the invention may be used to mix virtually any two fluids and is particularly applicable to the mixing of particulate matter with liquids. For example, the apparatus may also be used in mixing cement additives, such as fluid loss materials, and drilling muds.

Referring to the example of FIG. 1, the invention may be generally described as including mixing means 22 for mixing the polymer with a water spray and forming a water-polymer mixture having a motive energy; and a centrifugal diffuser 24, connected to the mixing means 22, for receiving the mixture from the mixing means 22, centrifugally diffusing the motive energy of the mixture, and hydrating the mixture into a gel. Although, depending upon space and height limitations and flow rate requirements, the mixing means 22 may discharge directly into the centrifugal diffuser 24, the prototype apparatus 20 includes separating means 26, connected to the mixing means 22, for receiving the water-polymer mixture and separating air from the mixture; and a pump 28, connected to the separating means 26, for imparting motive energy to the mixture and moving the mixture from the separating means 26. The mixture may be discharged from the pump 28 directly into a static hydration tank or other open container without using the centrifugal diffuser 24 if, for example, the apparatus 20 is to be used for batch mixing. Preferably, the centrifugal diffuser 24 is used to diffuse the motive energy of the mixture before entry into a hydration tank and to separate remaining air which may be contained within the fluid, as will be further discussed below.

The polymer is supplied to the apparatus 20 by polymer supply 40. Preferably, the polymer supply 40 is a hopper, also designated 40, which places the polymer in communication with a feeder 42 and which gravitationally feeds the bulk polymer to the feeder 42. The preferred feeder 42 is a metering feeder for metering a predetermined quantity of polymer to the apparatus over time, such as an Acrison feeder.

The Acrison feeder 42 has a larger conditioning auger or agitator 44 adjacent to the bottom of the hopper 40. The auger 44 "conditions" or stirs the polymer to generate a uniform bulk density and breaks up any clumps of the polymer particles. From the conditioning auger 44, the polymer falls into a feed chamber 48. A smaller metering auger 50 rotates within chamber 48 in order to discharge the polymer from the feeder 42 through outlet 52. In the Acrison feeder, the conditioning auger 44 and metering auger 50 rotate at dissimilar speeds. A motor 54 is connected to the augers 44, 50 through an appropriate drive system 56 to rotate the augers 44, 50. A speed transducer 58 may be connected to the drive system 56 to output a speed signal indicative of the speed of rotation of the augers 44, 50. A controller 60 may be provided to receive the speed signal and to regulate or control the motor 54 and thereby the speed of rotation of the augers 44, 50 and the quantity of polymer discharged by the feeder 42 over time, as will be further discussed below.

The feeder outlet 52 is connected to first branch 62 of tee 64. The second branch 66 of tee 64 is connected to the mixing means 22. The third branch 68 will normally be vented to the atmosphere to allow the free flow of air through the tee 64 and prevent the mixing means 22 from drawing a vacuum in the feeder 42. The Acrison feeder needs to be operated at atmospheric pressure for the feeder 42 to meter accurately.

Figure 2B:
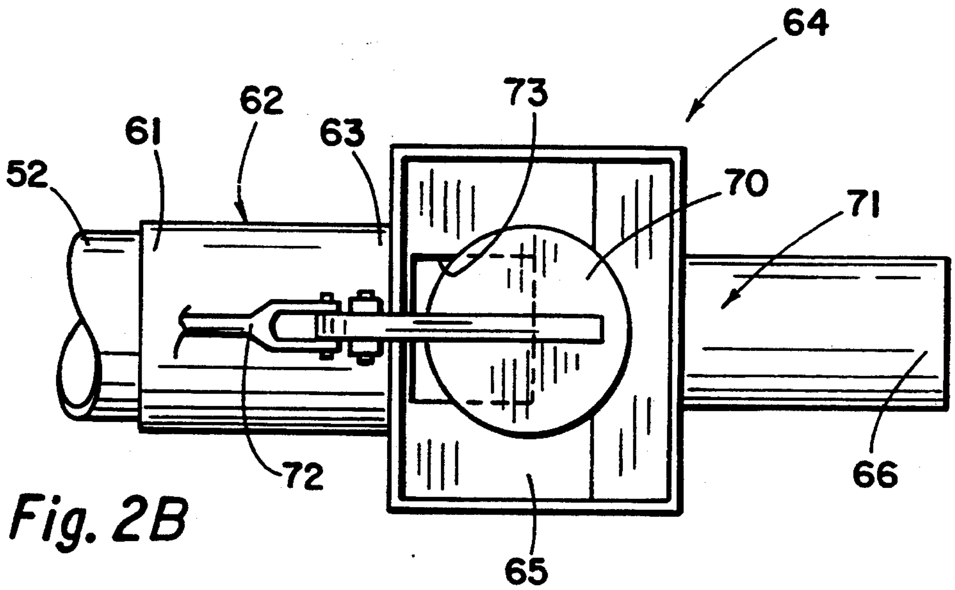
FIG. 2B is a top view of the tee of FIG. 2A with the flap valve in the open position.
Figure 2A:
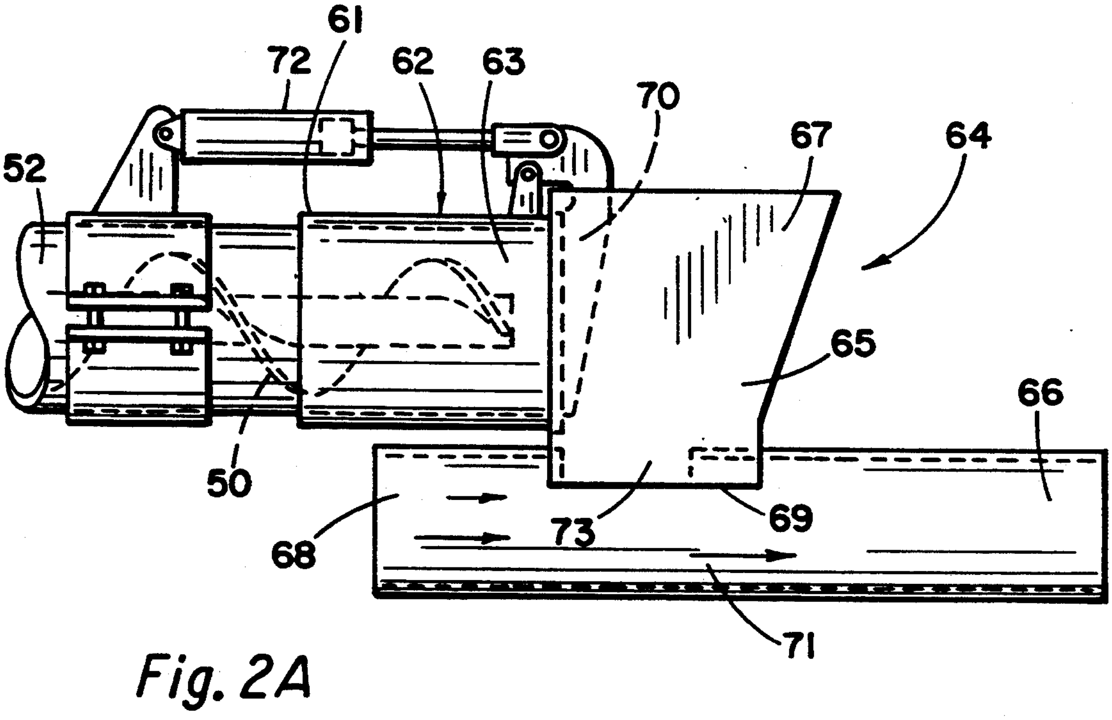
FIG. 2A is an elevational view of an embodiment of the tee used in the present invention.

Referring to FIG. 2A, in the prototype apparatus 20, the first branch 62 of the tee 64 is directly connected to the feeder outlet 52 and the second branch 66 of the tee 64 extends into the polymer inlet 80 (best seen in FIG. 1) of the mixing means 22. A flap valve 70 is connected to the feeder outlet 52 or to the second branch 62 of the tee 64. The flap valve 70 includes an actuator 72, such as a piston cylinder actuator, for opening and closing the flap valve 70 and the feeder outlet 52. The actuator 72 may be controlled by controller 60. The flap valve 70 will be closed when the feeder 42 is not in operation to prevent polymer powder from dribbling from the feeder outlet and thus causing a slug of polymer powder when the system is restarting. The prototype tee 64 is designed to accommodate flap valve 70 and to minimize the chances of applying a vacuum to the feeder 42. In the prototype tee 64, the first branch 62 is a conduit 62. The first end 61 of the conduit 62 is sized to connect directly to the feeder outlet 52. The second end 63 is connected to a funneling chamber 65. The funneling chamber 65 facilitates opening and closing of the flap valve 70, which is connected to the second end 63 of the first branch 62, and funnels the polymer discharged from the feeder 42 and first branch 62 into the second branch 66 of the tee 64. The funneling chamber 65 has an open upper end 67 and an open lower end 69 which is connected to the second branch 66. As best seen in FIG. 2B, the funneling chamber 65 is sufficiently larger than the flap valve 70 that the flap valve 70 does not significantly affect air flow through the open upper end 67 (and thereby apply a vacuum to the feeder 42) when the flap valve 70 is open (as illustrated in FIG. 2B). The second and third branches 66, 68 are opposite, open ends of a discharge conduit 71 and allow an air flow through the conduit 71 which will carry polymer out of the conduit 71 into the mixing means 22. The discharge conduit 71 has an opening 73 in one side for connection to the funneling chamber 65 and to receive the polymer discharged from the first branch 62.

In the preferred embodiment, the mixing means 22 is further defined as spraying the polymer with water at a substantially constant water velocity and at a substantially constant water spray pattern at all flow rates of the water. The preferred mixing means 22 is a water spraying induction mixer 22.

Figure 3:
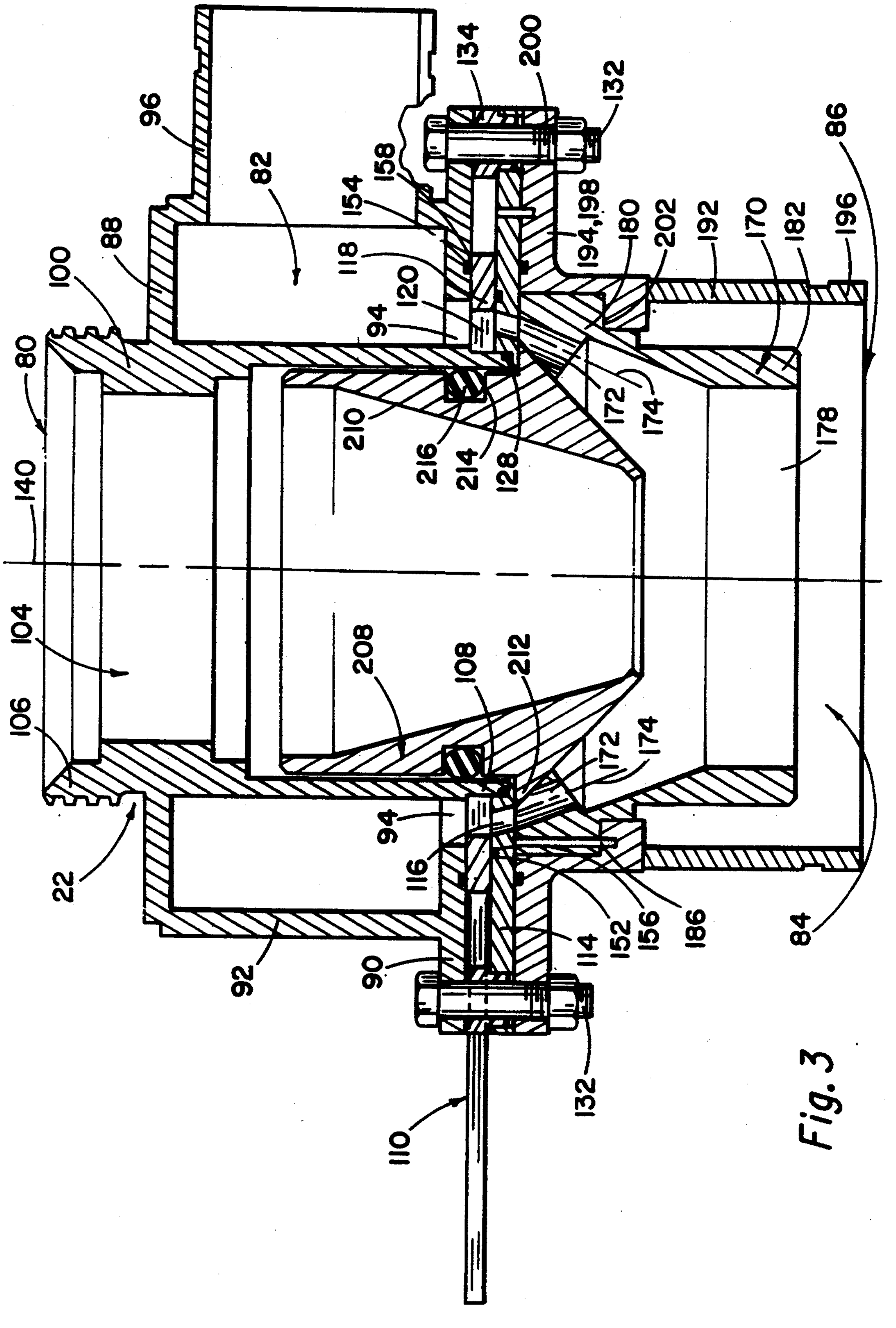
FIG. 3 is a cross-sectional view of an embodiment of the water spraying mixer used in the present invention.

Referring to the example of FIG. 3, in the preferred embodiment, the mixer 22 includes a polymer inlet 80, a water inlet 82 surrounding the polymer inlet, a mixing chamber 84 in fluid communication with the polymer and water inlets 80, 82, and an outlet 86 for discharging the water-polymer mixture from the mixing chamber 84. Earlier embodiments of the mixing means 22 are described in prior U.S. patent application Ser. Nos. 07/412,255, now U.S. Pat. No. 5,046,855 and 07/693,995, assigned to the assignee of the present invention, both of which are incorporated herein by reference thereto for purposes of disclosure. The mixing means 22 may be described as an axial flow mixer which conveys the polymer axially from the inlet 80 to the outlet 86, i.e., there are no elbows, bends, or nonlinearities in the flow axis along which the polymer is conveyed during its mixing with water prior to being discharged from the outlet 86.

The water inlet 82 of the mixer 22 includes an annular top plate 88, an annular bottom plate 90 having a central opening with a larger diameter than the central opening of the top plate 88, and a cylindrical sidewall 92 connected, such as by welding, to and between the top and bottom plates 88, 90. These components are disposed relative to each other as shown in FIG. 3 so that an axial opening 94 is created. The axial opening 94 provides an annular exit port through which the water from the water inlet 82 flows to the mixing chamber 84. The water inlet 82 includes an inlet sleeve 96 for connecting the inlet 82 to a water supply 98 (FIG. 1). Therefore, the axial opening 94 is in fluid communication with the inlet conduit 96 and water supply 98 through the annular interior region of the water inlet 82 defined by the connection of the polymer inlet member 100 to the top plate 88. Referring to FIG. 1, preferably, a pump 95, such as a centrifugal pump, and flow meter 97, such as a Halliburton turbine meter, are provided in the conduit 99 which connects the inlet conduit 96 to the water supply. The flow meter 97 measures the flow of water and provides a flow signal to controller 60 for controlling the mixing water delivery rate and the water spray in the mixing means 22 by means of valve means 110, as will be further discussed below.

Referring to FIG. 3, the polymer inlet member 100 is preferably generally cylindrical in shape and defines an axial passageway 104 between the top and bottom ends 106, 108 of the member 100. The top end 106 is connectable to the tee 64 so that the polymer inlet 80 receives polymer through top end 106 and directs it along the flow path of axial passageway 104 through bottom end 108.

The mixing means 22 includes valve means 110 for metering the water to be mixed with the dry polymer coming through the polymer inlet 80. The valve means 110 is disposed between the water inlet 82 and the mixing chamber 84 and the valve means 110 surrounds the polymer inlet 80 and inlet member 100. The mixing means 22 also includes an orifice plate 114 having a plurality of orifices 116 which also surround the polymer inlet 80. The valve means 110 is designed so that it opens all of the orifices 116 simultaneously and closes all of the orifices 116 simultaneously in order to create a complete spray pattern at all water flow rates. In the preferred embodiment, the valve means 110 includes a valve plate 118, located adjacent the orifice plate, and having a plurality of valve orifices 120. The valve plate is incrementally positionable between an open position in which the orifices 116 of the orifice plate 114 are aligned with the orifices 120 of the valve plate 118 and are fully open for passage of water from the water inlet 82 to the mixing chamber 84, and a closed position in which the orifices 116 of the orifice plate 114 are not aligned with the orifices 120 of the valve plate 118 and are fully closed to passage of water from the water inlet 82 to the mixing chamber 84.

Figure 4:
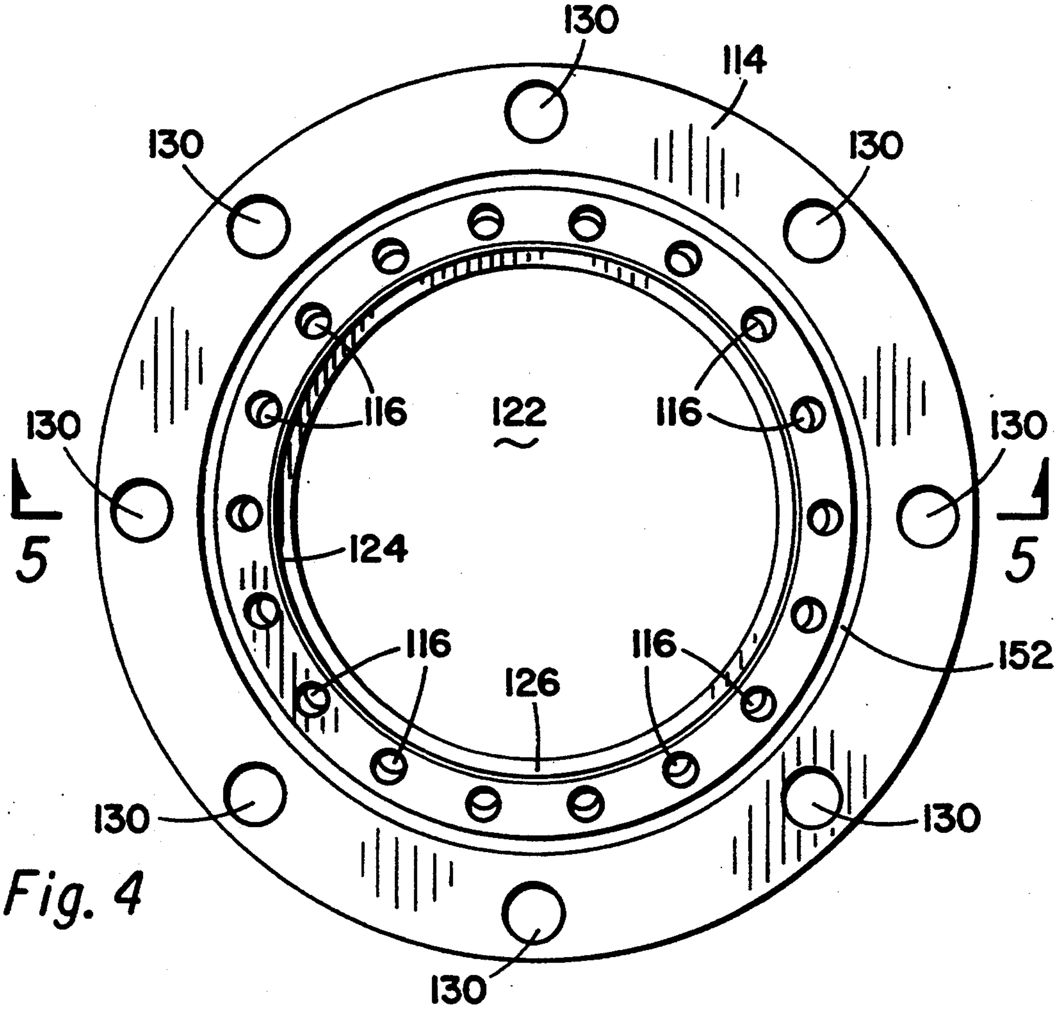
FIG. 4 is a plan view of an orifice plate of the mixer shown in FIG. 3.
Figure 5:
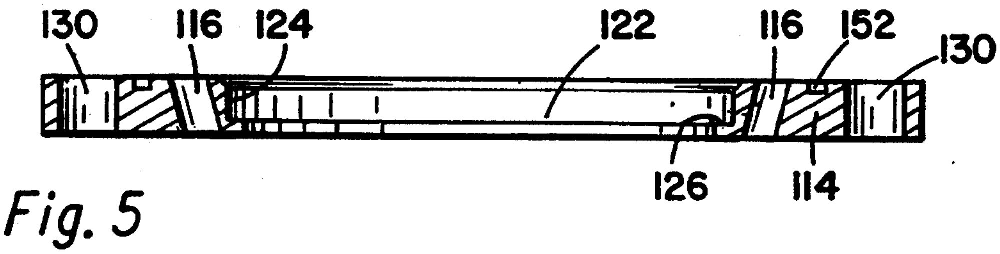
FIG. 5 is a cross-sectional view taken along line 5—5 in FIG. 4.

Referring to the example of FIGS. 4 and 5, orifice plate 114 includes an annular body 114 having a central opening 122 defined by an inner periphery 124 about which the plurality of orifices 116 are located. Although the number and size of the orifices may be varied, in the preferred embodiment, the orifice plate 114 includes 18 orifices equiangularly spaced around the opening 122. The inner periphery 124 includes an annular notch or shoulder 126 which is used to house a seal 128 (best seen in FIG. 3), such as an O-ring, to prevent passage of water between the inner periphery 124 of the orifice plate 114 and the outside wall of the polymer inlet member 100. The orifice plate 114 also includes holes 130 for receiving retaining bolts 132 and spacers 134 (best seen in FIG. 3) which are used to align and secure the components of the mixing means 22. The spacers 134 also prevent the bolts 132 from clamping the valve plate 118 and restricting its movement.

Referring to the example of FIG. 3, when the orifice plate 114 is connected to the bottom plate 90 of the water inlet 82 with the bolts 132, the orifices 116 are disposed below the axial opening 94 of the water inlet 82. The orifice plate 114 is also concentrically disposed about the polymer inlet member 100. The positioning of the polymer inlet member 100 in the central opening 122 retains the orifice plate 114 in proper concentric alignment with the polymer inlet member 100. Thus, the orifice plate 114 is disposed adjacent to the valve plate 118 and between the valve plate 118 and the mixing chamber 84.

The valve plate 118 is disposed concentrically about the polymer inlet member 100 adjacent to the axial opening 94 of the water inlet 82. The valve plate 118 is pivotally held between the bottom plate 90 of the water inlet 82 and the orifice plate 114 such that the valve plate 118 will pivot about the flow axis 140 extending through the polymer inlet 80, orifice plate 114, and valve plate 118. The valve plate 118 is incrementally pivotable between an open position in which the orifices 116 of the orifice plate 114 are fully opened for passage of water from the water inlet 82 to the mixing chamber 84 and a closed position in which the orifices 116 of the orifice plate 114 are fully closed to passage of water from the water inlet 82 to the mixing chamber 84.

Figure 6:
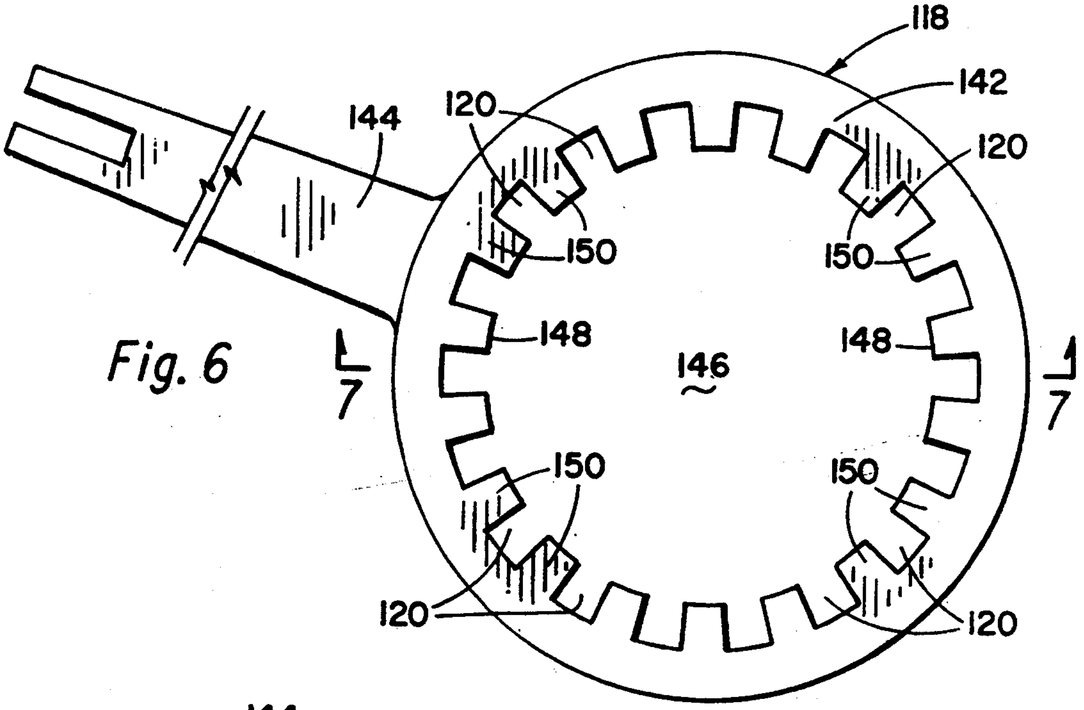
FIG. 6 is a plan view of a valve plate of the mixer shown in FIG. 3.
Figure 7:
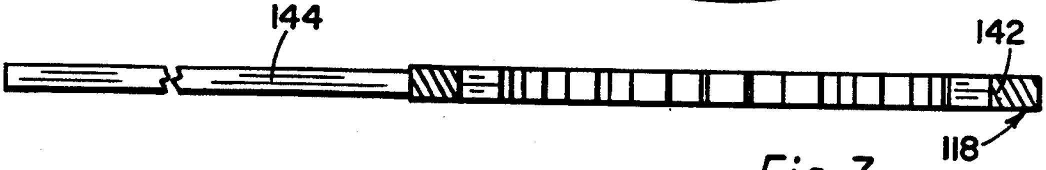
FIG. 7 is a cross-sectional view taken along line 7—7 of FIG. 6.

The overall construction of the valve plate 118 is exemplified in FIGS. 6 and 7. The preferred embodiment of the valve plate 118 includes an annular body 142 from which an actuating arm 144 extends about radially outwardly. The actuating arm 144 may be engaged by a suitable actuating device 145 (best seen in FIG. 1), such as a computer controlled actuator, or may be manually actuated. Preferably, the actuator 145 is controlled by controller 60 to regulate the size of the orifices 116 and thereby proportion the flow of water (as may be measured by flow meter 97) through the orifices 116 to the quantity of polymer being metered (by feeder 42 and controller 60) into the polymer inlet 80, while maintaining a substantially constant velocity of the water sprayed through the orifices 116.

The annular body 142 includes a central opening 146 defined by an inner periphery 148 which has a notched or toothed configuration, as best seen in FIG. 6. The teeth 150 are sized and positioned such that when the orifices 116 of the orifice plate 114 are fully closed, a tooth 150 overlies every orifice 116 of the orifice plate 114. As illustrated in FIG. 6, the valve orifices 120 are openings between the teeth 150 of the valve plate 118. The valve orifices 120 are positioned and sized such that all of the orifices 116 in the orifice plate 114 are opened (or closed) simultaneously and to the same degree as the valve plate 118 is pivoted towards the open (or closed) position, e.g., the teeth 150 should be sized and positioned such that the radially extending edges of the teeth simultaneously open (or close) the orifices 116 in substantially equal incremental amounts as the valve plate 118 is pivoted. Therefore, the valve plate 118 can be used to maintain a constant pressure drop or flow of water across the valve means 110 and through the orifices 116 of the orifice plate 114 while maintaining a water flow through all of the orifices 116. The retaining bolts 132 on either side of the actuating arm 144 limit the pivotal travel of the arm 144 and valve plate 118. The spacing and sizing of the bolts 132, arm 144, orifices 116, 120, and teeth 150 should be selected to allow full opening and closing of the orifice plate orifices 116 within the travel limits of the arm 144.

Referring to FIG. 3, groove 152 is provided in the surface of the orifice plate 114 and groove 154 is provided in the surface of the bottom plate 90. The grooves 152, 154 receive seals, such as O-rings 156, 158, respectively, which seal against the surface of the valve plate 118. Groove 154 and seal 158, which seal between the bottom plate 90 and the valve plate 118, have a greater diameter than the groove 152 and seal so that the groove 154 encompasses a greater area of valve plate 118 than is encompassed by groove 152. Therefore, the water pressure which exists during operation of the mixing means 22 acts on the greater upper surface area of valve plate 118 sealed by groove 154 and seal 158 in order to bias the valve plate 118 downwardly against the orifice plate 114 and thereby minimize leakage between the orifice plate 114 and valve plate 118.

The positioning of the polymer inlet member 100 in the central opening 146 of the valve plate 118 retains the valve plate 118 in proper concentric alignment with the polymer inlet member 100 and the orifice plate 114. This also maintains proper alignment between the valve orifices 120 and the orifices 116 in the orifice plate 114. It also permits the valve plate 118 to be pivoted relative to the orifice plate 114 so that the teeth 150 and valve orifices 120 can be positioned to control the flow of water passing from the water inlet 82 to the mixing chamber 84 for mixing with the polymer axially received through the polymer inlet 80. The orifice plate 114 and valve plate 118 are designed, in the preferred embodiment, to provide a valve assembly 110 through which water can be flowed at a substantially constant velocity for different water flow rates. As used throughout this document, the term "constant velocity" encompasses velocity variations which are not significant to the practical purposes of the invention.

Referring to the example of FIG. 3, in the preferred embodiment, the mixing means 22 includes spray guide 170. The preferred spray guide 170 surrounds the polymer inlet and extends between the orifice plate 114 and the mixing chamber 84 and has a plurality of orifices 172 coincident with the orifice 116 of the orifice plate 114. The polymer inlet 80, water inlet 82, mixing chamber 84, outlet 86, orifice plate 114, valve plate 118, and spray guide 170 have a coextensive flow axis 140 along which the polymer flows through the mixing means 22. Each orifice 172 of the spray guide 170 has a linear longitudinal axis 174 extending through the spray guide and directed obliquely towards the flow axis 140 and outlet 86 and tangentially to a radial arc 176 about the flow axis 140. The orifices 172 are thereby directed to create a converging and crisscrossing spray pattern having several focal points along the flow axis 140, as best seen in FIGS. 8A–8C and 9A–9C. The orifices 172 may take the form of slots or grooves which create a notched or toothed configuration similar to the valve plate 118 and which are continuously open to the interior of the spray guide 170.

As exemplified in FIGS. 8A–8C and 9A–9C, preferably, the orifices **172*a*–172*c* are directed tangentially at various radial distances from the flow axis 140 and obliquely at various angles towards the flow axis 140. The preferred orifices 172*a*–172*c* are also located in opposed pairs, the orifices 172*a*–172*c* of each pair being located on opposing sides of the mixing chamber 84 and spray guide 170 and being directed along parallel tangents having the same radial distance from the flow axis 140 and at the same oblique angle toward the flow axis 140. Preferably, the orifices 116 are inclined through the orifice plate 114 in such a manner that they are approximately coaxial with the spray guide orifices 172*a*–172*c* in order to align the flow of water through the orifices 116 with the orifices 172*a*–172*c*. It is contemplated that such alignment will reduce pressure losses in the water flowing through the orifices 116, 172 and thereby provide a higher water velocity and mixing energy in the mixing chamber 84** and reduce water erosion of the component parts.

The structure of the spray guide 170 and arrangement of the orifices 172 will now be discussed in more detail. Referring to the example of FIG. 3, the spray guide 170 is generally annular in shape and has a spray guide body, also designated 170, surrounding an opening 178. The spray guide body 170 has an upper end 180 and a lower end 182. The upper end 180 forms a flange which is used for connecting the spray guide 170 between the orifice plate 114 and the outlet 86. The flange of the upper end 180 also provides the axial and radial dimension to the upper end 180 needed to house the orifices 172.

Figure 8A:
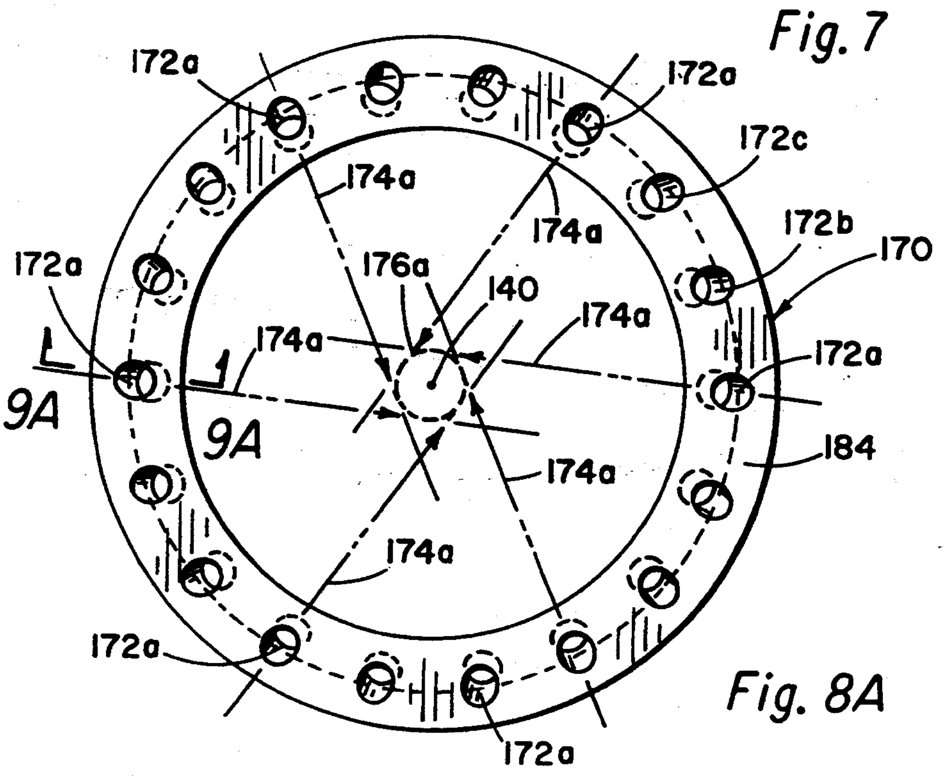
FIGS. 8A–8C are plan views of a spray guide of the mixer shown in FIG. 3.
Figure 8B:
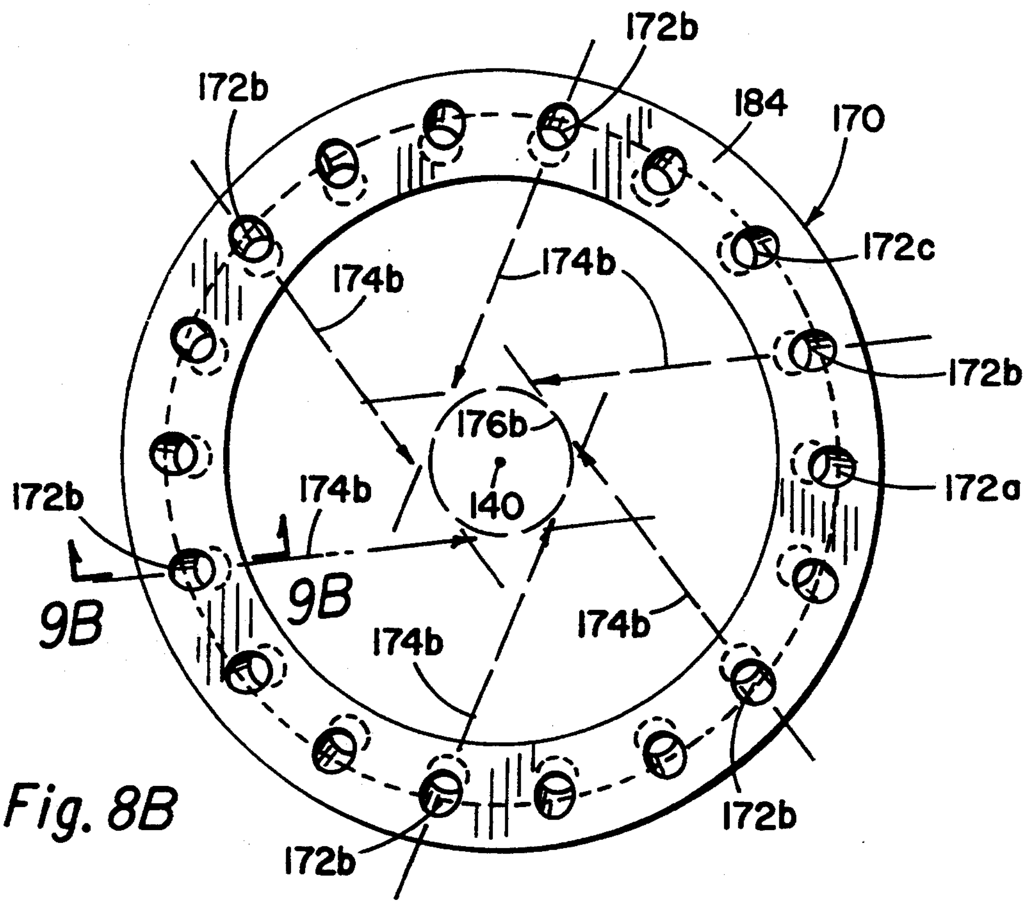
Figure 8C:
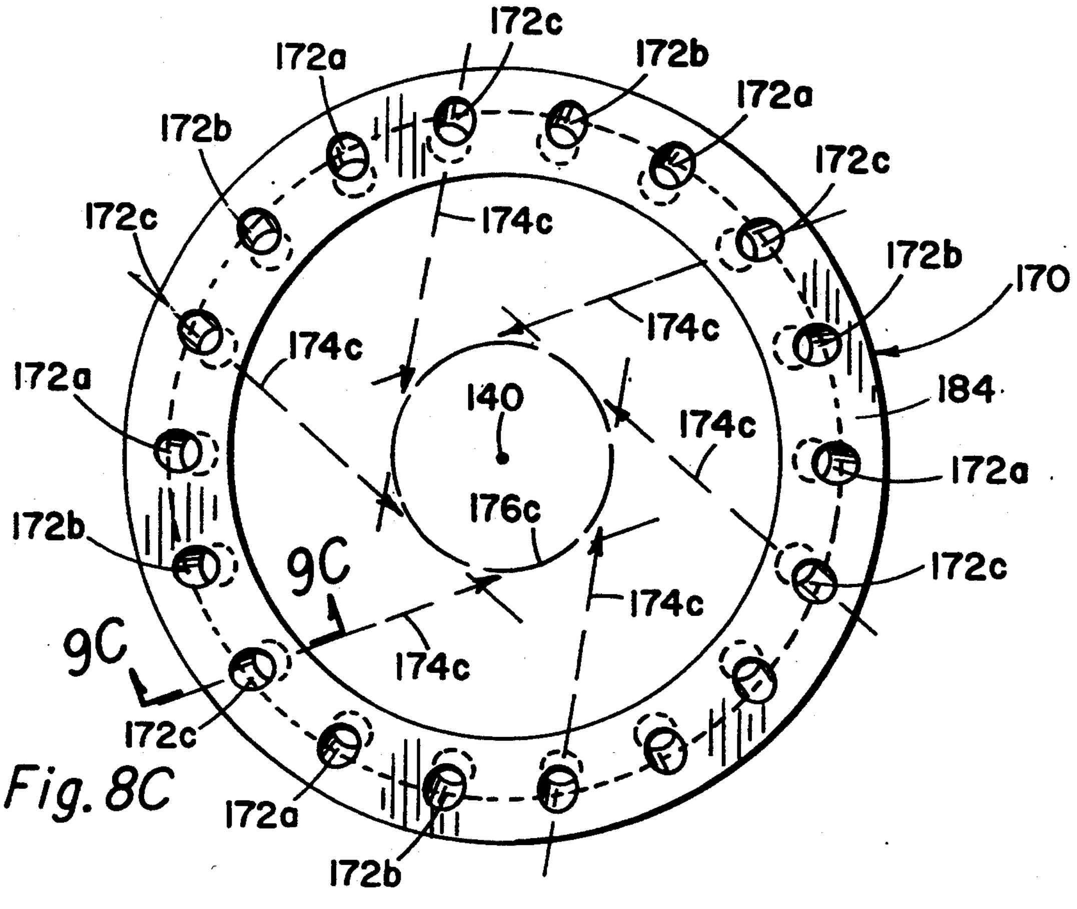

Referring to FIGS. 8A–8C and 9A–9C, at the upper surface 184 of the upper end 180, the orifices **172*a*–172*c* form the same pattern as and are aligned with the orifices 116 of the orifice plate 114, that is, there are 18 orifices 172*a*–172*c* equiangularly spaced around the annular upper surface 184. As with the orifice plate 114, the number of orifices 172 may be varied. Referring to the example of FIGS. 8A–8C, in the preferred embodiment, the orifices 172 are grouped into three sets of orifices. The orifices of the three sets are respectively identified by the reference numerals 172***a*, 172*b*, 172*c*. The orifices of each set 172*a*, 172*b*, 172*c* are located in three opposed pairs such that the longitudinal axes 174*a*, 174*b*, 174*c* of each opposed pair are directed along parallel tangents to the same radial arc 176*a*, 176*b*, 176*c* about the flow axis 140, as seen in FIGS. 8A–8C.

Figure 9C:
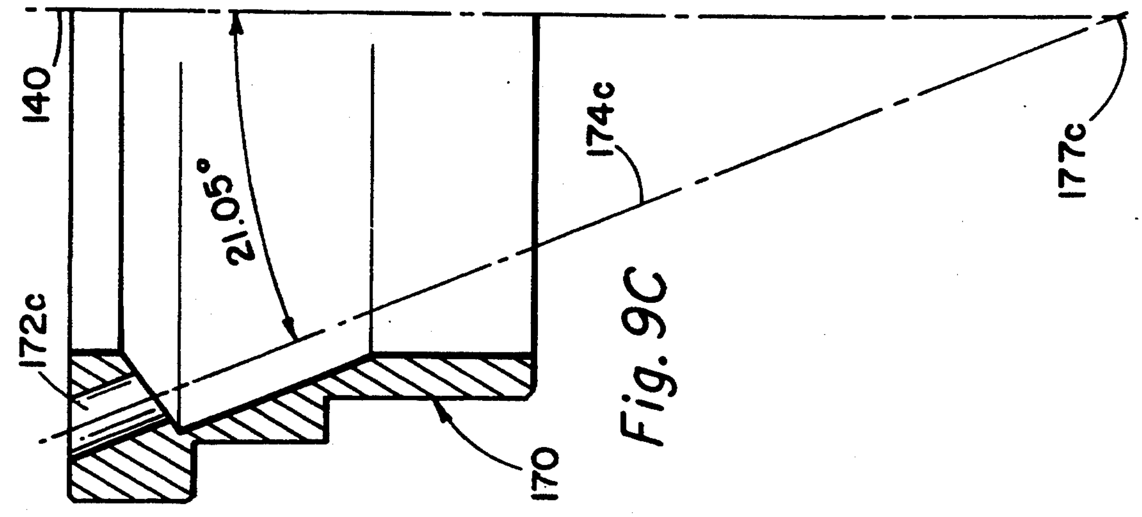
FIG. 9C is a cross-sectional view taken along line 9C—9C in FIG. 8C.
Figure 9B:
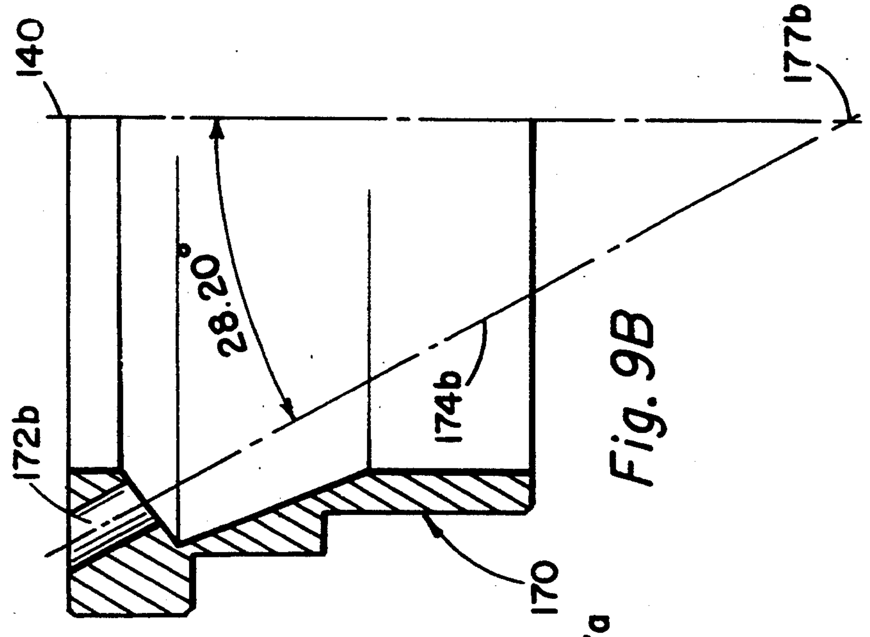
FIG. 9B is a cross-sectional view taken along line 9B—9B in FIG. 8B.
Figure 9A:
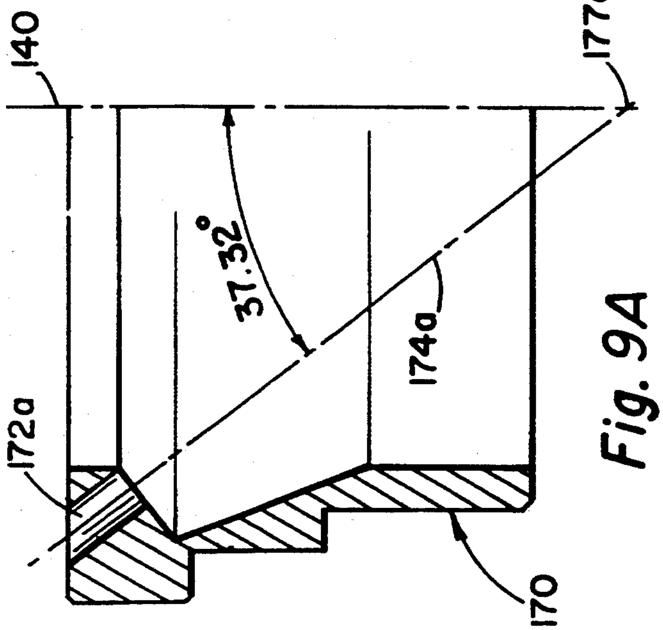
FIG. 9A is a cross-sectional view taken along line 9A—9A in FIG. 8A.

Referring to the examples of FIGS. 9A–9C, the longitudinal axes 174*a*, 174*b*, 174*c* of each set of orifices 172*a*, 172*b*, 172*c* are directed obliquely towards the flow axis 140 at the same angle, i.e., in the prototype spray guide the longitudinal axes 174*a* form an angle of 37.32° with the flow axis 140, the longitudinal axes 174*b* form an angle of 28.20° with the flow axis 140, and the longitudinal axes 174*c* form an angle of 21.05° with the flow axis 140. Because of the difference in the angles between the longitudinal axes 174*a*, 174*b*, 174*c* with the flow axis 140, each set of orifices 172*a*, 172*b*, 172*c* has a different focal point 177*a*, 177*b*, 177*c*, respectively, along the flow axis 140. Since the water jet or stream sprayed from the orifices 172*a*, 172*b*, 172*c* will flow along the longitudinal axes 174*a*, 174*b*, 174*c*, the spray guide 170 will create a converging and crisscrossing spray pattern having several focal points 177*a*, 177*b*, 177*c* along the flow axis 140. At each focal point there will be some collision between the converging water jets creating a spray which will assist in wetting the polymer traveling from the polymer inlet 80 through the spray pattern. The orientation of the longitudinal axes 174*a*, 174*b*, 174*c* along tangents at various radial distances from the flow axis 140 provides a crisscrossing pattern (when viewed from the upper end 180 of the spray guide 170) which reduces voids in the water spray through which the polymer may pass unwetted. The spray pattern, as viewed from a radial perspective, will create a geometric shape approximating a hyperboloid of one sheet, as defined by the formula $x^2/a^2+y^2/b^2-z^2/c^2=1$. It is contemplated that the more axial orientation of the water spray jets from the spray guide 170 (in comparison to prior induction mixers) discharges the mixture from the mixing means 22 at a higher motive energy, enhances the air flow through the mixing means 22 and the vacuum created at the polymer inlet 80, and reduces splashing of the spray onto the polymer guide inside surface 210 (FIG. 3) which can create gel buildup and choking.

Referring to the example of FIG. 3, the lower end 182 of the spray guide 170 extends axially towards the outlet 86 to provide a baffle which reduces splattering and intensifies the energy of the initial mixing of polymer and water. The spray guide 170 includes an indexing hole 186 which is used to index and fix the orifices 172 of the spray guide 170 with respect to the orientation of the orifices 116 of the orifice plate 114. A retaining pin (not illustrated) may be placed in the indexing hole 186 to retain the spray guide 170 in the desired rotational orientation with respect to the orifice plate 116.

Referring to FIG. 3, the outlet 86 of the mixing means 22 is formed by outlet body 192. The outlet body is generally cylindrical in shape and has an upper end 194 and a lower end 196. The upper end 194 includes a flange 198 extending radially outwardly from the body 192 which has bolt holes 200 through which the retaining bolts 132 pass. Thus, the outlet body 192 may be bolted to the bottom plate 90 of the water inlet 82 with the orifice plate 116 and valve plate 118 sandwiched between. The cylindrical outlet body 192 surrounds the spray guide 170 and mixing chamber 84. An annular shoulder 202 extends radially inwardly near the upper end 194 of the outlet body 192 and is used to securely fasten the spray guide 170 between the outlet body 192 and orifice plate 114.

Referring to the example of FIG. 3, the prototype mixing means 22 also includes a polymer guide 208 which is concentrically housed in the polymer inlet 80. The polymer guide 208 has a conically-shaped inside surface 210 which guides the incoming dry polymer into the most intense area of the water spray pattern created by the spray guide 170. The prototype polymer guide 208 includes an annular flange 212 which extends radially outwardly from the outside surface of the guide 208 and which is shaped to secure the polymer guide 208 between the lower end of the polymer inlet member 100 and the upper surface 184 of the spray guide 170. A circumferential groove 214 is formed in the outside surface of the polymer guide 208 to house a seal, such as an O-ring 216, for sealing the area between the outside surface of the polymer guide 208 and the inside surface of the polymer inlet member 100 and prevent passage of polymer and water therethrough.

Referring to the example of FIG. 1, in the prototype apparatus 20, the outlet 86 of the mixing means 22 is connected to the separating means 26. The outlet body 192 may be connected directly to the separating means 26 or a conduit may be used to carry the water-polymer mixture from the outlet 86 to the separating means 26. Although the mixing means 22 may be oriented with the flow axis 140 in a vertical or inclined orientation, in the prototype apparatus 20, the mixing means 22 is oriented in a substantially horizontal orientation which allows the feeder 42 and hopper 40 to be placed at a lower elevation. Preferably, the axis 140 of the mixing means 22 slopes slightly downward towards the outlet 86 so that fluids will gravitationally drain from the mixing means 22. As will be discussed below, in some applications of the invention, such as when it is mounted on a trailer for transportation on public roads, the overall height of the apparatus 20 becomes a critical factor.

Although the separating means 26 may be any type of tank or conventional separator, the preferred separating means 26 is a centrifugal separator 26 which is connected to the outlet 86 of the mixing means 22 for receiving the mixture from the mixing means 22, centrifugally separating air from the mixture, and providing a flow path for the mixture discharged from the mixing means 22 which does not significantly restrict air flow through the mixing means 22. The centrifugal separator 26 allows the jet pump 28 to operate more efficiently by removing air from the mixture which may otherwise reduce the capacity of the pump 28.

Figure 11:
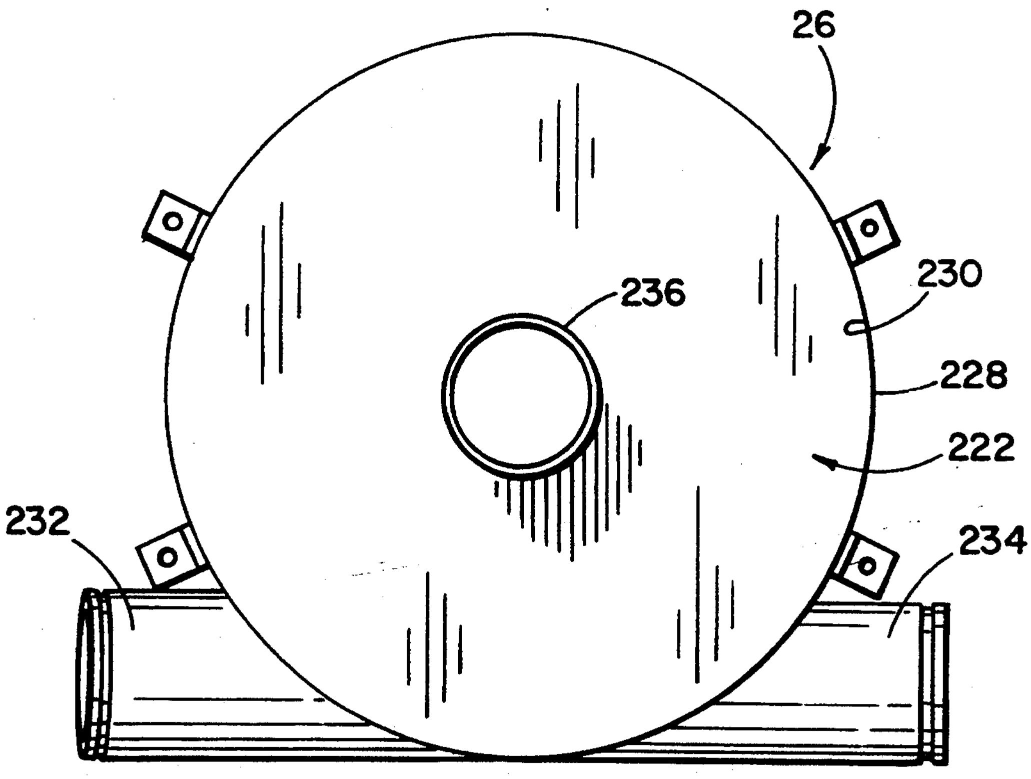
FIG. 11 is a plan view of FIG. 10.
Figure 10:
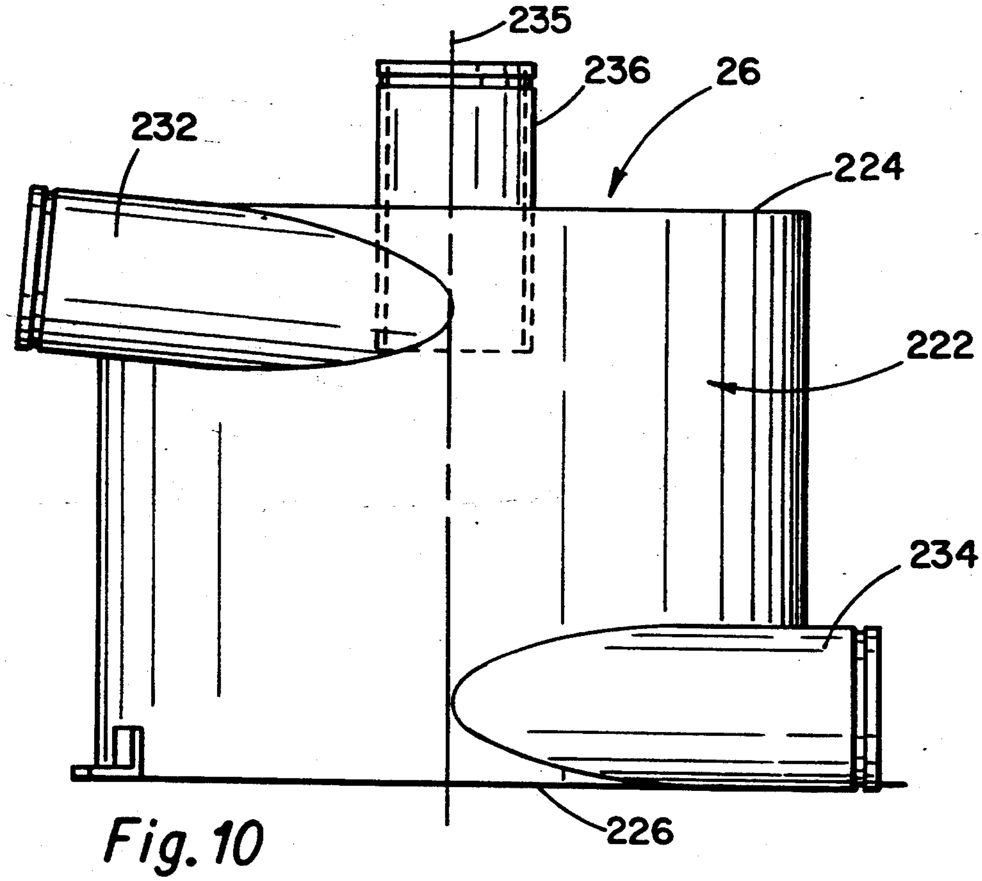
FIG. 10 is an elevational view of an embodiment of a centrifugal diffuser used in the present invention.

Referring to FIGS. 10 and 11, the preferred centrifugal separator 26 includes a separator chamber 222 having an upper end 224, a lower end 226, and an outside wall 228 having an about cylindrical inside surface 230. A tangential upper inlet 232 is provided at the upper end 224 of the chamber 222 for receiving and directing the mixture from the mixing means 22 into a circumferential flow path around the inside surface 230 of the outside wall 228 of the separator chamber 222. A tangential lower outlet 234 is provided at the lower end 226 of the chamber 222 for receiving and discharging the circumferentially flowing mixture from the chamber 222. Preferably, the upper inlet 232 of the chamber 222 is skewed toward the lower end 226 of the chamber 222 in order to direct the circumferential flow of the mixture along a downward spiral toward the lower end of the chamber 222. In the prototype separator 26, the inlet 232 is skewed downwardly approximately 5 degrees with respect to a line perpendicular to the axis 235 of the chamber 222. The downward spiral of the flow is desirable to reduce collision of the mixture entering the inlet with mixture which is circumferentially flowing around the inside surface 230 of the chamber 222. An air vent 236 is provided in the upper end 224 of the chamber 222 to ensure unrestricted flow of the separated air from the separator 26. Unrestricted flow of air through the separator 26 allows unrestricted flow of the water-polymer mixture and air from the outlet 86 of the mixing means 22 which in turn enhances the vacuum created at the polymer inlet 80 of the mixer 22. The inventor has found that the use of such a separator 26 with the mixing means 22 creates sufficient vacuum at the polymer inlet that the tee 64 and feeder outlet 52 may be placed at an elevation below the elevation of the polymer inlet 80 and/or at a remote location from the polymer inlet 80. This allows the overall height of the apparatus 20 to be reduced by placing the hopper 40 and polymer supply at a lower elevation than the polymer inlet 80 and contributes significantly to the viability and practicality of mounting the apparatus on a trailer for transportation on public roads.

The air vent 236 of the separator 26 extends several inches above the upper end 224 and extends several inches below the upper end 224 into the separator chamber 222 in order to prevent any splatter of the mixture from escaping from the separator 26 and to minimize buildup of splatter inside the air passageway through the air vent 236. In operation, the mixture discharge from the mixer 22 has sufficient motive energy that it flows centrifugally around the inside surface 230 of the outside wall 228 and creates a vortex in the center of the separator chamber 222. In order to allow unrestricted flow of air from the separator 26, the inlet 232, outlet 234 and separator chamber 222 should be sized so that the mixture flows freely into and out of the separator 26 at the maximum capacity of the mixing means 22.

Figure 12:
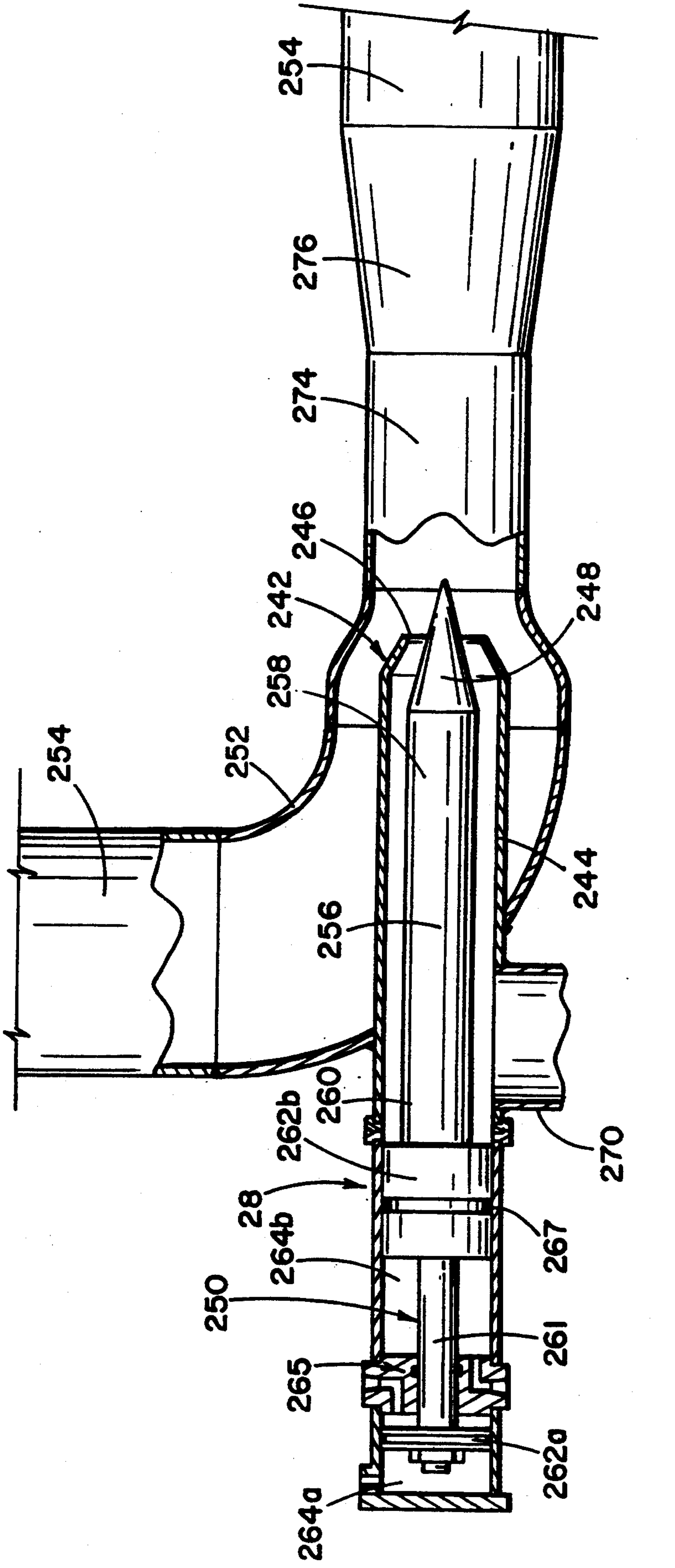
FIG. 12 is a partially cross-sectioned elevational view of an embodiment of a jet pump used in the present invention.

Referring to the example of FIG. 1, the mixture flows from the outlet 234 of separator 26 to pump 28. The preferred pump 28 is a jet pump 28 which includes injection means 242 for injecting water into the mixture at a substantially constant velocity at all flow rates of the mixture from the separator 26. Referring to FIG. 12, the preferred injection means 242 includes a water injection conduit 244 having an orifice 246 for injecting water into the mixture; a valve 248, movably positioned in the orifice 246, for varying the size of the orifice 246; and actuator means 250, connected to the valve 248, for moving the valve and controlling the size of the orifice in response to changes in the flow rate of the mixture from the separating means 26. Preferably, the water injection conduit 244 is placed in an elbow 252 in the conduit 254 connecting the separator 26 to the diffuser 24. The injection conduit 244 is oriented so that the orifice 246 injects water in the same flow direction as the flow direction of the mixture from the separator 226 to the diffuser 24.

In the prototype injection means 242, the actuator means 250 includes a rod 256 having a first end 258 connected to the valve 248 and a second end 260 connected to pistons 262*a*, 262*b*. The pistons 262*a*, 262*b* are in a sealed piston chamber 264*a*, 264*b*. Referring to FIG. 1, a piston actuator 266 is connected to the piston chamber 264 on both sides of the cylinder isolating block 265 and may be used to regulate pneumatic or hydraulic pressure on either side of the block 265 in order to move the pistons 262*a*, 262*b* and thereby move the valve 248 in the orifice 246. The piston actuator 266 may be connected to controller 60 which automatically adjusts the position of the piston 262 and valve 248 to obtain a desired water flow rate through the conduit 244 and orifice 246. Referring to FIG. 12, appropriate sealing means 267 for sealing the piston chamber 264*a*, 264*b* from the water in injection conduit 244 should be provided. The pistons 262*a*, 262*b* act as guides for maintaining proper alignment of the valve 248 in the orifice 246, as does the sliding engagement of piston connecting shaft 261 with isolating block 265.

Conduit 244 also includes a high pressure connection 270 for connecting a source of high pressure water, such as a centrifugal pump 268 and water line 269, to the conduit 244, as best seen in FIG. 1. A flow meter 272, such as a Halliburton turbine meter, may be placed in the high pressure water line 269 to measure the flow of water through the conduit 244 and orifice 246 and generate a flow signal which may be used by the controller 60 to control the position of the valve 248 in the orifice 246 and to proportion the flow of water through the jet pump 28 to the flow of mixture from the mixing means 22. The valve 248 and orifice 246 may be shaped to achieve desired flow characteristics, as would be known to one skilled in the art in view of the disclosure contained herein.

Primary functions of the variable orifice injection means 242 are to control the injection water rate and to maintain the injection of water into the mixture at a substantially constant velocity at all flow rates of the mixture. The injection means 242 achieves this by maintaining a substantially constant pressure drop across the orifice 246, i.e., between the water pressure inside the conduit 244 and the pressure of the mixture in the conduit 254 downstream of the injection means 242. Various control strategies may be used with the injection means 242 of the present invention to achieve this goal, as would be known to one skilled in the art in view of the disclosure contained herein. For example, pressure sensors (not illustrated) may be used to measure the pressure in water line 269 and in the conduit 254 and generate pressure signals which may be used by the controller 60 to control the speed of the pump 268 such that the pressure in water line 269 is held substantially constant. The position of valve 248 is used to control the rate of flow through the orifice 246. The jet pump 28 also contributes to the mixing of water with the mixture because of the high energy at which the jet pump 28 injects water into the mixture.

A section of reduced size ("jet throat") 274 in the conduit 254 is provided immediately downstream of the injection means 242 in order to create a venturi effect which increases the velocity of the water from the jet pump 28 in the jet throat 274, which in turn reduces the pressure in the conduit 254 upstream of the jet pump 28 in order to suck or pull the mixture into the water discharge of the jet pump. A diverging section 276 is provided in the conduit 254 immediately downstream of the jet throat 274 in order to allow the velocity of the mixture exiting the jet throat to slow down and to reduce the pressure loss in the mixture flowing from the diverging section 276 to the centrifugal diffuser 24. The diverging section 276 creates a gradual transition from the reduced diameter of the jet throat to the larger diameter of conduit 254 in order to prevent a sudden pressure drop and cavitation in the mixture exiting the jet throat 274.

As previously discussed, the jet pump 28 and separator 26 may be eliminated if there are no height limitations on the apparatus, i.e., if the polymer supply 80 and mixing means 22 can be located at an elevation with respect to the centrifugal diffuser 24 such that the mixing means 22 can be connected directly to the centrifugal diffuser 24.

Figure 14:
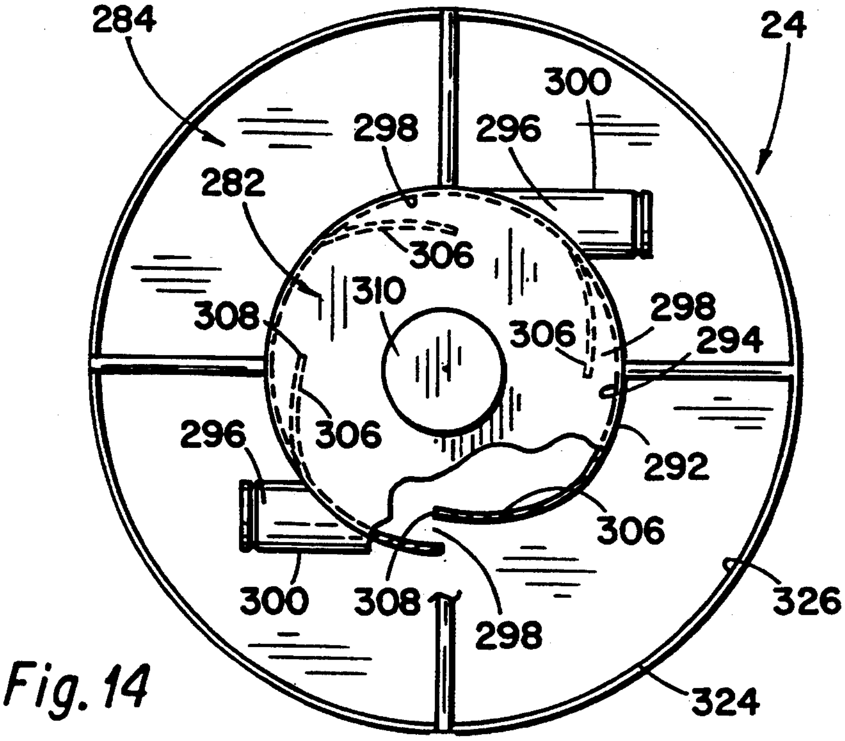
FIG. 14 is a partially cross-sectioned plan view of FIG. 13.
Figure 13:
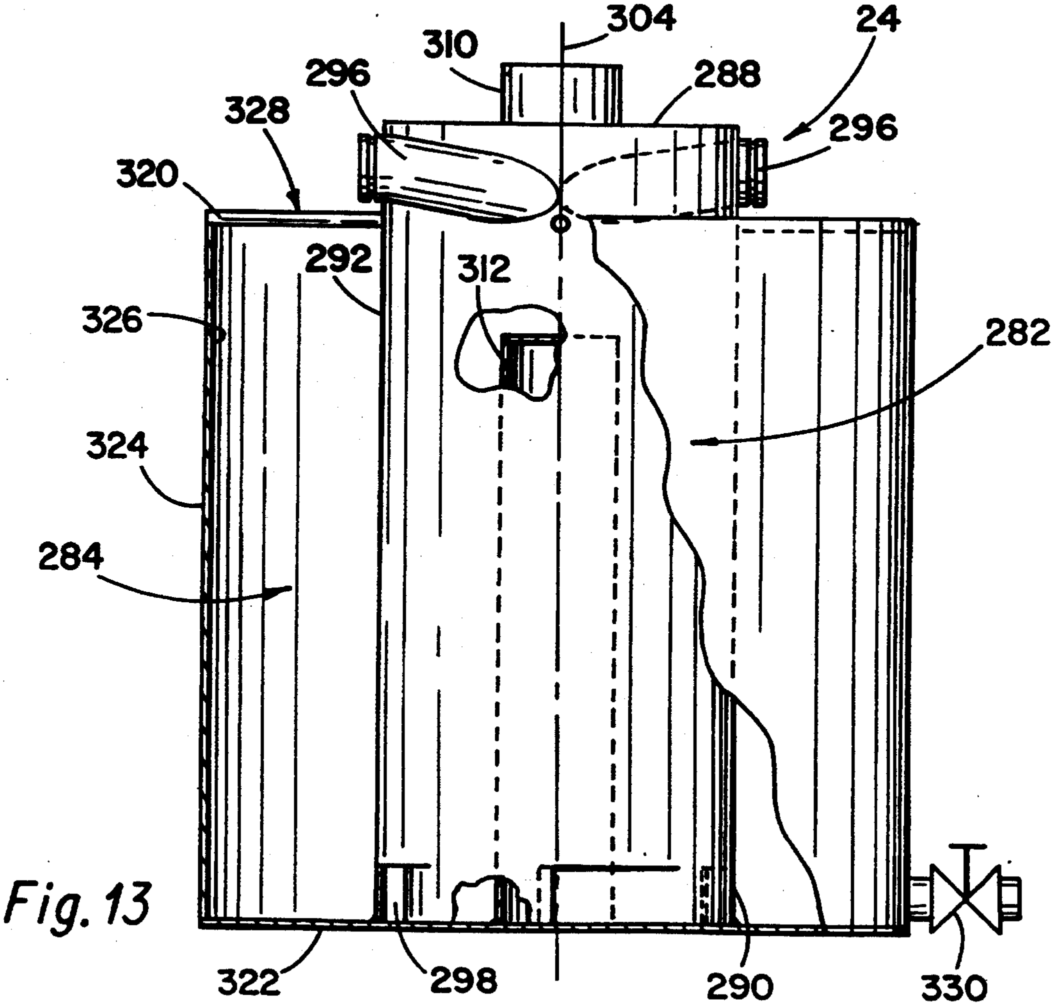
FIG. 13 is a partially cross-sectioned elevational view of an embodiment of a centrifugal diffuser used in the present invention.
Figure 15:
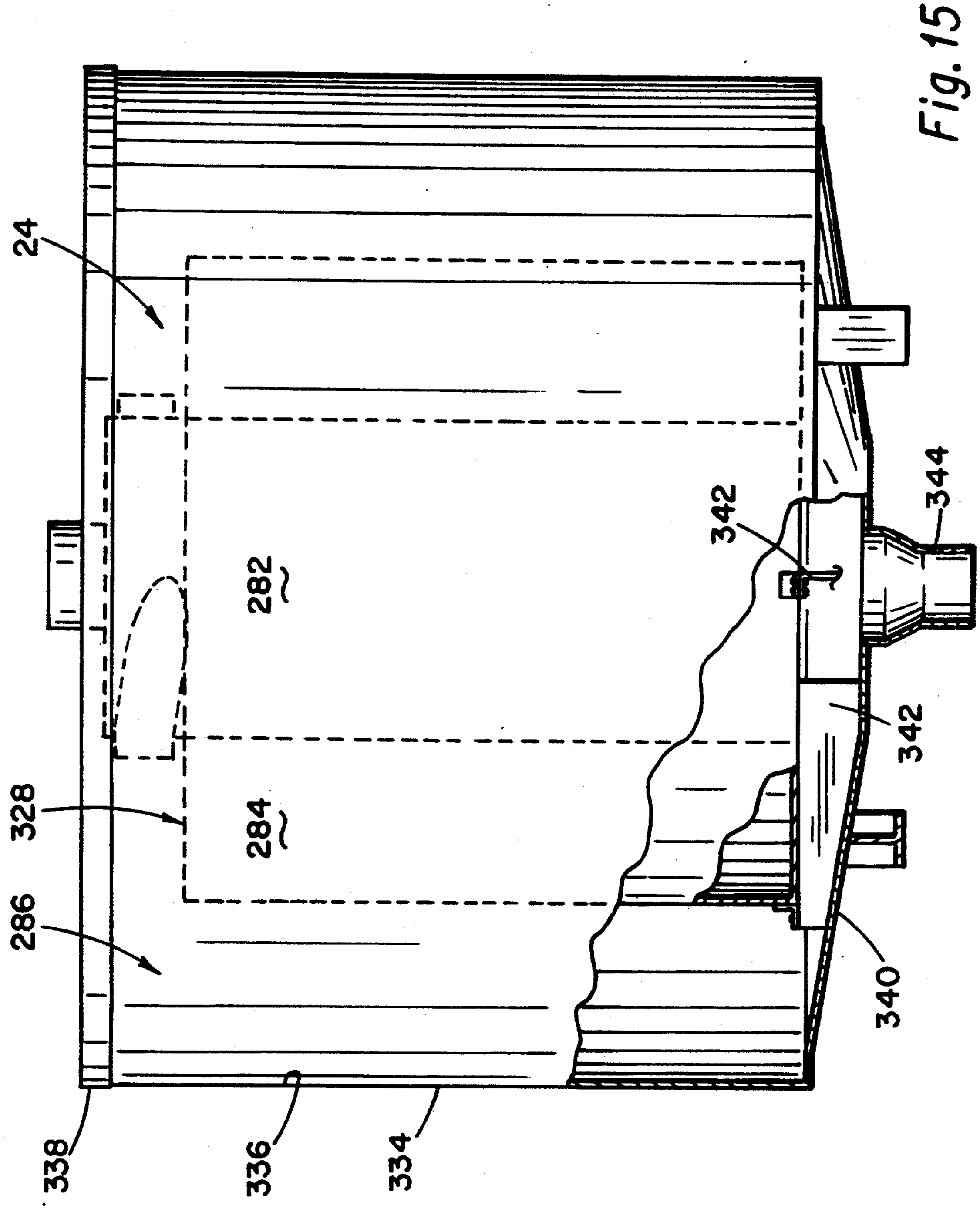
FIG. 15 is a partially cross-sectioned elevational view of an embodiment of a hydration tank used in the present invention.

As previously mentioned, the mixture is discharged from jet pump 28 through conduit 254 which may be connected to a static hydration tank (not illustrated) or other container for hydrating the water-polymer mixture. Preferably, referring to the example of FIG. 1, the conduit 254 is connected to centrifugal diffuser 24. Referring to the example of FIGS. 13–15, in the preferred embodiment, the centrifugal diffuser 24 includes an inner chamber 282, an outer chamber 284 surrounding the inner chamber 282, and a hydration tank 286 surrounding the outer chamber 284. The inner chamber 282 has an upper end 288, a lower end 290, an outside wall 292 having an about cylindrical inside surface 294, a tangential upper inlet 296 for receiving and directing the mixture discharge from the mixing means 22 into a circumferential flow path around the inside surface 294 of the inner chamber 282, and a lower outlet 298 at the lower end 290 of the chamber 282 for discharging the circumferential flowing mixture from the inner chamber 282. The upper inlet 296 is a conduit which does not restrict the incoming flow of mixture and is connected to the inner chamber in such a manner that the outermost wall 300 (with respect to the central axis of the inner chamber 282) of the conduit 296 is approximately tangential to the curvature of the cylindrical inside surface 294 of the outside wall 292 of chamber 282. Preferably, the upper inlet 296 is skewed toward the lower end 290 of the inner chamber 282 in order to direct the circumferential flow of the mixture along a downward spiral toward the lower end 290 of the chamber 282. As with the separator 26, this downward skew of the upper inlet prevents collision of the incoming mixture with mixture which is flowing circumferentially around the inner chamber 282. As illustrated in FIGS. 13 and 14, multiple upper inlets 296 may be provided on the inner chamber 282. The additional inlets 296 may be used to input additional water, chemical additives and agents, or additional water-polymer mixture for hydration. In the prototype apparatus 20, a second upper inlet 296 is positioned on the inner chamber 282 at a position diametrically opposite to the first upper inlet 296. The second upper inlet directs the incoming flow of mixture tangentially to the inside surface 294 of the outside wall 292 and also skews the circumferential flow of the mixture along a downward spiral toward the lower end 290 of the chamber 282. The second inlet 296 directs the circumferential flow in the same direction (counterclockwise as seen in FIGS. 14 and 15) as the first inlet 296. The 180° separation and downward skew of the inlets 296 prevents collision and splattering of the incoming streams of water-polymer mixture. The preferred inlets 296 are skewed downwardly at an angle of 9° with respect to a line perpendicular to the central axis 304 of the inner chamber 282 and are located at an elevation above the fluid level in the inner chamber (which will normally be the same as the fluid level in the hydration tank 286) in order to prevent the discharge of the incoming mixture directly into the resident fluid. Discharging the incoming mixture directly into the resident fluid may entrain air in the fluid and causes splashing which can undesirably discharge gel through air vent 310.

In the prototype apparatus 20, the second inlet 296 receives the water-polymer mixture created by a second mixing means 22, separator 26, and jet pump 28 (not illustrated) which are provided for redundancy. This redundancy provides several advantages, which include providing two hoppers 40 and feeders 42 so that the apparatus 20 may be continuously operated, e.g., one hopper 40 may be used to provide polymer to the apparatus 20 while the other hopper 40 is being refilled with dry polymer; the redundancy reduces the size of the hoppers 40 and mixers 22 allowing the overall height of the apparatus 20 on a mobile trailer to be reduced; and the redundancy provides for continuous operation if one of the redundant components breaks down.

The preferred lower outlet 298 of the inner chamber 282 includes a guide vane 306 extending from the outlet 298 into the inner chamber 282 for guiding the circumferentially flowing mixture out of the inner chamber 282 so that the mixture flows circumferentially around the outer chamber 284. In the prototype apparatus 20, there are a plurality of lower outlets 298 and guide vanes 306. The outlets 298 are created by cutting a flap in the outside wall 292 and bending the flap into the inner chamber 282 so that the flap becomes the guide vane 306. The guide vanes 306 are oriented so that they catch the circumferential flowing mixture in the inner chamber 282, e.g., in the example of FIG. 14, the mixture flows counterclockwise around the inside surface 294 of the outside wall 292 and the guide vanes 306 are bent or skewed in a clockwise direction from their connection to the outside wall 292 so that the free end 308 of the guide vane is directed clockwise in the inner chamber 282 and catches the circumferentially flowing mixture. It is theorized that the guide vanes 306 will assist in capturing the centrifugal energy of the downward flowing mixture in the inner chamber 282 and use the captured centrifugal energy to assist in creating a circumferential upward flow in the outer chamber 284.

In the prototype apparatus 20, the centrifugal diffuser 24 is also used to centrifugally separate air from the water-polymer mixture. This feature is particularly beneficial in the embodiment in which the mixing means 22 is mounted directly on the centrifugal diffuser 24. To that end, the preferred inner chamber includes an air vent 310 in the upper end 288 of the chamber 282. The preferred air vent 310 is a cylindrical conduit which extends axially away from the closed upper end and chamber 282 to prevent discharge of the water-polymer mixture through the air vent 310.

The centrifugal separator 26 and jet pump 28 may be eliminated if there are no height limitations (such as the height limitations necessary to mount the apparatus 20 on a mobile trailer and transport it on public roads) on the apparatus 20, i.e., if the polymer supply 40 and mixing means 22 can be located at an elevation with respect to the centrifugal diffuser 24 such that the mixing means 22 can be connected directly to the centrifugal diffuser 24. A primary purpose of the jet pump 28 is to elevate the mixture discharged from the mixing means 22 to the upper end of the centrifugal diffuser 24 and a primary purpose of the centrifugal separator 26 is to eliminate air from the mixture discharged from the mixing means 22 so that the jet pump 28 will operate effectively. It is contemplated that the mixing means 22 and centrifugal diffuser 24 may create sufficient vacuum at the polymer inlet 80 to vacuum the polymer powder from the tee 64 into the polymer inlet 80, even with the hopper 40, feeder 42, and tee 64 located at a sufficiently low elevation to comply with most public road height limitations, and may therefore eliminate the need for the separator 26 and jet pump 28.

Referring to example FIG. 13, the preferred inner chamber 282 also includes a post 312 extending axially from the closed lower end 290 of the chamber 282. The post is concentrically positioned with respect to the central axis 304 of the chamber 282. The post acts as a drag point for the circumferentially flowing mixture, retards the flow rate, and assists in dissipating or diffusing the motive energy of the mixture and in reducing vortexing. Sufficient space should be left above the post, i.e., between the top of the post 312 and the upper inlet 296 and air vent 310, to allow air separated from the circumferentially flowing mixture to escape from the inner chamber 282 through the air vent 310 without restriction.

Referring to example FIGS. 13 and 14, the outer chamber has an upper end 320, a lower end 322, an outside wall 324 having an about cylindrical inside surface 326, and an outlet 328 at the upper end 320 of the chamber 284. The lower end 322 of the outer chamber 284 receives the mixture discharged from the inner chamber 282 so that the mixture flows upwardly from the lower end 322 to the outlet 328 of the outer chamber 284. In the prototype diffuser 24, the outer chamber 284 is separated from the inner chamber 282 by the outside wall 292 of the inner chamber 282. The mixture flows centrifugally from the inner chamber 282 through the lower outlets 298 of the inner chamber 282 and circumferentially upwardly around the inside surface 326 of the outer chamber's outside wall 324. The lower end 322 of the outer chamber is sealed or closed and may be closed with a bottom plate that also closes the lower end 290 of the inner chamber 282. In the preferred diffuser 24, the outside wall 324 of the outer chamber 284 is substantially concentric with the outside wall 292 of the inner chamber 282. The outside wall 324 of the outer chamber 284 extends from the lower end 322 of the outer chamber 284 upwardly to an elevation lower than the inlet 296 of the inner chamber 282 and lower than the upper elevation of the outside wall 334 of the hydration tank 286. The upper end 320 of the outer chamber 284 is open above the outside wall 324 so that the upper end 320 of the outside wall 324 forms the outlet 328 of the outer chamber 284. Therefore, the mixture flowing circumferentially upward through the outer chamber flows circumferentially over the outer chamber's outside wall 324 into the hydration tank 286. Valve 330 and appropriate connections are provided to drain the chambers 282, 284.

Referring to the example of FIG. 15, the hydration tank 286 receives the mixture discharged from the outer chamber 284 and completes the hydration of the mixture. In the preferred hydration tank 286, the outside wall 334 has a generally cylindrical inside surface 336. The upper end 338 of the hydration tank 334 is open to allow air which is separating from the hydrating mixture to escape. The lower end 340 of the hydration tank 286 forms a floor 340 extending below the inner and outer chambers 282, 284. The inner and outer chambers are supported above the hydration tank floor 340 on supports 342 such that the hydrating mixture flowing into the hydration tank 286 from the outer chamber 284 may flow beneath the inner and outer chambers 282,284. Hydration tank 286 has an outlet 344 in the floor 340 below the inner and outer chambers 282, 284 for discharging the gel from the hydration tank 286. Preferably, the floor 340 of the hydration tank 286 slopes downwardly toward the center of the floor 340 and the outlet 344 to assist the gel in flowing to the outlet 344.

Thus, it may be seen that the centrifugal diffuser 24 receives the mixture discharged from the jet pump 28, centrifugally diffuses the motive energy of the mixture without creating bubbles or foam which can entrain air in the mixture, centrifugally separates air from the mixture, and flows the mixture in a first-fluid-in, first-fluid-out flow regime in order to hydrate the polymer into a uniform gel. The diffuser 24 uses the centrifugal, circumferential downward flow path through the inner chamber 282 to diffuse the motive energy and separate air which may be entrained in the mixture. The centrifugal and upward flow through the outer chamber 284 and over the outside wall 324 of the outer chamber also facilitates separation of entrained air from the hydrating mixture, i.e., the upward flow over the outside wall 324 encourages the natural upward movement of entrained air bubbles to separate from the mixture. Further, the controlled circumferential flow downward through the inner chamber 282, upward through the outer chamber 284, and outwardly to the outside wall 334 of the hydration tank 286 and then downwardly and inwardly to the outlet 344 of the hydration tank controls the flow of the mixture so that the first fluid into the inner chamber 282 is the first fluid out of the hydration tank outlet 344 and thereby provides the on-line residence time necessary for the mixture to hydrate into a gel.

The gel discharged from the hydration tank outlet 344 may be discharged directly to a fracturing blender or other known equipment for use in treating a subterranean well. In the prototype apparatus 20, the gel exiting the hydration tank outlet 344 will normally be in a concentrated form. By using the equipment from the mixing means 22 through the centrifugal diffuser 24 to create a concentrated gel (rather than a working strength gel), the sizes of the mixing means 22, diffuser 24, separator 26, and jet pump 28 may be reduced and/or the flow rate through the same equipment may be reduced, thereby increasing the residence time of the mixture flowing through the equipment and providing time for the mixture to hydrate into a gel as it is being continuously produced. It is contemplated that in the prototype apparatus 20, the gel exiting the hydration tank 286 will be at a concentration of between 80 and 120 pounds of polymer per 1,000 gallons of water. A typical working strength gel has a concentration of 20 to 40 pounds of polymer per 1,000 gallons of water. Therefore, the flow through the hydration tank 286 of the concentrated gel is approximately one-third the flow rate which would be required to flow working strength gel through the hydration tank. This decreased flow rate allows the residence time necessary for the mixture to hydrate and eliminates the need for a large hydration tank at the job site. Another advantage of providing a gel concentrate at the hydration tank outlet 344 is that the dilution of the concentrate may be controlled instantaneously to provide whatever working strength gel viscosity that is desired, as will now be discussed.

In the prototype apparatus 20, referring to the example of FIG. 1, dilution means 350 is connected to the outlet 344 of the hydration tank 286 for mixing water with the gel and producing a diluted gel. Water supply 98 is connected to the dilution means. The water should be provided at a higher pressure than the flowing pressure of the gel in order to provide a mixing energy. The dilution means 350 injects water from the water supply 98 into the gel and adjusts the flow rate of the water injected into the gel in response to changes in the flow rate of the gel from the centrifugal diffuser 24 and hydration tank 286 such that the gel and water are mixed at about the same mixing energy at all flow rates of the gel.

Figure 16:
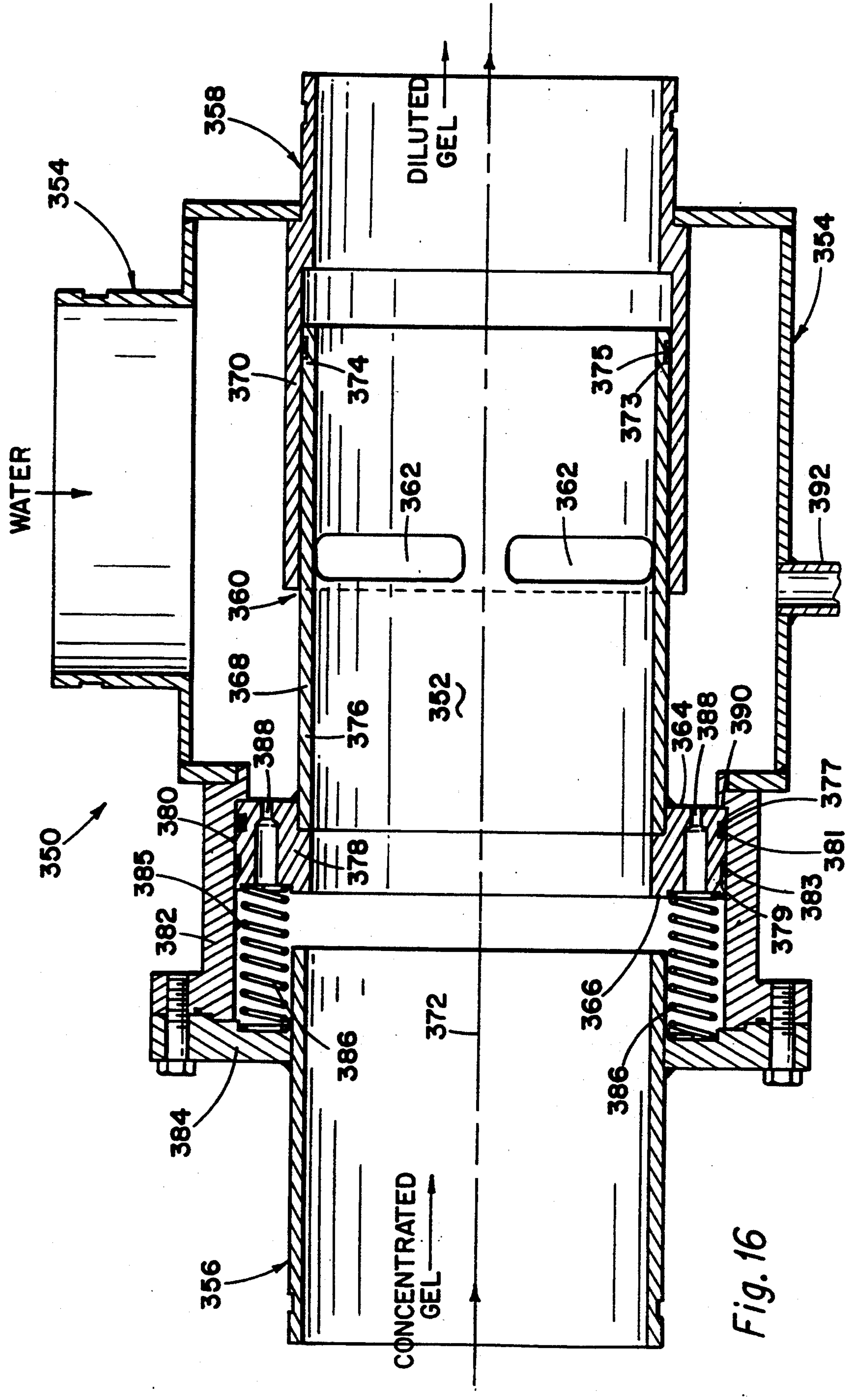
FIG. 16 is a cross-sectional view of an embodiment of a dilution valve used in the present invention.

Referring to the example of FIG. 16, the preferred dilution means 350 is a mixing valve 350 which includes a mixing chamber 352 having a water inlet 354, a gel inlet 356, and a outlet 358 for discharging the diluted gel. A valve 360 is movably disposed between the water inlet 354 and the mixing chamber 352 for regulating the size of an orifice 362 between the water inlet 354 and the mixing chamber 352 and thereby regulating the flow of water from the water inlet 354 into the mixing chamber 352. The preferred valve 360 includes a first surface 364 exposed to the water pressure in the water inlet 354 and a second surface 366 exposed to the gel pressure in the gel inlet 356 so that changes in the water pressure or concentrated gel pressure move the valve 360 and change the size of the orifice 362 and thereby maintain a substantially constant pressure difference between the water pressure in the water inlet 354 and the gel pressure in the gel inlet 356. This constant differential pressure maintains a substantially constant velocity of the water injected into the gel in the mixing chamber 352 and thereby maintains a substantially constant mixing energy at all flow rates of the gel, i.e., if the flow rate of the gel varies, the pressure in the gel inlet 356 varies and the valve 360 is moved to maintain a constant pressure difference between the water pressure in the water inlet 354 and the gel pressure in the gel inlet 356. In the prototype apparatus 20, the dilution means 350 will be designed to maintain a pressure drop of about 15 psi between the water inlet 354 and gel inlet 356. Normally, the water pressure at the water inlet 354 will be 30 psig and the pressure at the gel inlet 356 will be approximately 15 psig.

In the prototype dilution means 350, the valve 360 includes a first conduital member 368 connected to the first and second surfaces 364, 366 of the valve 360. The first member 368 is telescopingly engaged with a second conduital member 370 such that the first and second conduital members 368, 370 surround the mixing chamber 352 and define a flow passageway from the gel inlet 356 to the outlet 358 with the water inlet 354 surrounding the first and second conduital members 368, 370. At least one of the conduital members 368, 370 includes a plurality of orifices 362 positioned around the mixing chamber 352 so that movement of the first conduital member 368 varies the size of the orifices 362 between a fully opened size and a fully closed size. In the preferred dilution means, the cylindrical gel inlet 356, cylindrical outlet 358, first conduital member 368, and second conduital member 370 define a substantially straight flow axis 372 through the dilution means 350 and mixing chamber 352. The second conduital member 370 is securely connected to (or formed with) the outlet 358 and extends into the mixing chamber. The first conduital member 368 has an internal diameter approximately equal to the internal diameter of the gel inlet 356 and outlet 358 and has a first end 374 which extends inside the second conduital member 370 for telescoping engagement therewith. The second conduital member 370 acts as a coaxial guide for the movable first conduital member 368 and assists in maintaining proper alignment of the first conduital member 368 as the first conduital member 368 telescopes. A circumferential groove 373 is provided in the outside surface of the first end 374 of the first conduital member 368 and a seal 375, such as an O-ring, is provided in the groove to prevent fluid communication between the outside surface of the first conduital member 368 and the inside surface of the second conduital member 370.

The second end 376 of the first conduital member 368 is securely connected to a flange 378. The flange 378 extends radially (with respect to flow axis 372) from the second end 376. The flange 378 has an outside peripheral surface 380 which is in contact with connecting sleeve 382. Connecting sleeve 382 connects the outlet 358 to the water inlet 354. The flange 378 has two radially extending annular surfaces which form the first surface 364 and second surface 366 of the valve 360. Circumferential grooves 377, 379 are provided in the outside peripheral surface of the flange 378. A seal 381, such as an O-ring, is place in the innermost circumferential groove 377 to prevent fluid communication between the outside peripheral surface 380 of the flange 378 and the inside surface 384 of the connecting sleeve 382. A wear ring 383 is placed in the outermost groove 379 to reduce friction between the outside peripheral surface 380 of the flange 378 and the inside surface 385 of the connecting sleeve 382 and prolong the life of the dilution means 350. Inlet flange 384 extends radially from the outside surface of the inlet 356 and is used to connect the connecting sleeve 382 to the inlet 356. Springs 386 are connected between the inlet flange 384 and the second surface 366 of the valve flange 378 to bias the first conduital member 368 into the second conduital member 370. Flushing orifices 388 are provided through the valve flange 378 so that a continuous flow of water flows from the water inlet through the springs 386 and the annular space surrounding the springs 386 in order to flush gel from the springs 386 and prevent the gel from hardening in and around the springs 386 and causing the dilution means 350 to malfunction.

In the prototype dilution means 350, the orifices 362 are slots 362 in the body of the first conduital member 368. The orifices 362 are arranged around the mixing chamber 352 so that the water from water inlet 354 is injected through the orifices 362 and intersects the gel flowing through the mixing chamber 352 at a high velocity and mixing energy in order to facilitate intermingling and homogeneous mixing of the water with the concentrated gel. Preferably, the water is injected about perpendicularly into the flowing gel. As the differential pressure between the water inlet 354 and gel inlet 356 varies, the differential pressure between the first and second surfaces 364, 366 of the flange 378 will vary causing the first conduital member 368 to telescope within the second conduital member 370, thereby opening or closing the orifices 362 until the desired differential pressure is established. The desired differential pressure between the water pressure in the water inlet 354 and the concentrated gel pressure in the gel inlet 356 can be preselected by appropriately selecting the strength of the springs 386 once the surface areas of the first and second surfaces 364,366 are known, as would be apparent to one skilled in the art in view of the disclosure contained herein.

Annular shoulder 390 in the connecting sleeve 382 and the body of the inlet 356 create stops which limit the travel of the first conduital member 368. Orifices (not illustrated) should be provided in the inlet body 356 adjacent the springs 386 so that the second surface 366 of the valve flange 378 will be exposed to the pressure in the gel inlet 356 when the valve 360 and orifices 362 are fully opened, i.e., when the second surface 366 of the valve flange 378 is in contact with the gel inlet body 356. Drain connection 392 is provided for draining the dilution means 350.

Referring to example FIG. 1, diluted, working strength gel is discharged from the dilution means 350 through line 398 to discharge connection 400, which may be a discharge manifold or other well-known fluid connection. From the discharge connection 400 the gel flows to a gel user, such as a fracturing blender which mixes sand with the gel, or other known well-treatment devices. In most uses of well-treatment gels, an important property of the gel is its viscosity. For example, it is the high viscosity of the gel which enables it to transport sand or proppant into a well. In prior gel hydration systems, there has been a significant delay time required to increase (or decrease) the viscosity of the gel, since the viscosity has been increased by putting more (or less) liquid gel concentrate or polymer powder into the hydration tank of a system and waiting for the newly added polymer to hydrate into gel, which could take several minutes. The apparatus 20 of the present invention overcomes this problem by providing a viscometer 402 which is connected to an outlet of the dilution means 350 (or placed in discharge line 398) for measuring the viscosity of the diluted gel and producing a viscosity signal. The viscometer 402 may be any commercially available viscometer which is capable of measuring the viscosity of the gel on-line, i.e., as the gel is passing through the line 398 and viscometer 402.

Control means 60 is provided for receiving the viscosity signal and adjusting the flow of gel from the centrifugal diffuser 24 and hydration tank 286 to the dilution means 350 in order to adjust the viscosity of the diluted gel to a desired viscosity. As previously mentioned, in the prototype apparatus 20, the gel discharged from the hydration tank 286 is in a concentrated form and therefore has a significantly higher viscosity than required for a working strength gel. Since the dilution means 350 maintains a substantially constant differential pressure between the water inlet 354 and the gel inlet 356, increasing the flow of gel concentrate to the gel inlet 356 will increase the pressure at the gel inlet 356 which will cause the dilution means 350 to reduce the amount of water injected into the gel, thereby increasing the viscosity of the gel discharged from the dilution means 350. Conversely, if the flow of gel concentrate from the hydration tank 286 to the dilution means 350 is reduced, the pressure at the gel inlet 356 will decrease and the valve 360 will open the orifices 362 to increase the pressure in the gel inlet 356 (i.e., to maintain a constant differential pressure) and will thereby increase the proportion of water in the diluted gel and reduce the viscosity of the gel discharged from the dilution means 350. This viscosity control system (viscometer 402 and control means 60) allows the viscosity of the gel at the discharge connection 400 to be adjusted in a matter of seconds.

The preferred control means 60 is further defined as comparing the viscosity signal to a set point signal indicative of the desired viscosity of the diluted gel and outputting a control signal indicative of the flow of gel from the centrifugal diffuser 24 to the dilution means 350 necessary to achieve the desired viscosity. This control signal may be used to open an outlet valve (not illustrated) and increase the discharge of gel from the outlet 344 of the hydration tank 286. The preferred apparatus 20 includes a metering pump 404, such as a positive displacement vane pump, connected between the centrifugal diffuser 24 and the dilution means 350, for receiving the control signal and pumping a correlating flow of gel from the centrifugal diffuser 24 to the dilution means 350. There will normally be a conduit 406 connected from the hydration tank outlet 344 to the dilution means inlet 356 and the metering pump 404 will be connected in the line 406 to pump gel from the hydration tank 286. A motor 403 is connected to the metering pump 404 through an appropriate drive system to receive the control signal from controller 60 and power the pump 404. A speed transducer 405 may be connected to the motor 403 to provide a feedback signal indicative of the speed of the motor 403 and pump 404 (and the pumping rate of the pump 404) to the controller 60. A bypass line 408 and bypass valve 410 may be provided to bypass the metering pump 404 and dilution means 350. The bypass line 408 may be used in situations when it is not necessary to provide a concentrated gel from the hydration tank 286, i.e., when the flow rate of working strength gel required by the gel user is sufficiently low that the gel will hydrate to its working strength while passing through the centrifugal diffuser 24 at the flow rate required by the gel user.

The controller 60, or controller means 60, is preferably a computer-based control system which allows manual or automatic control of the apparatus 20. As an example of automatic operation of the apparatus 20, when the apparatus 20 is on-line and providing gel to a fracturing job, a flow meter 412, which may be a Halliburton turbine meter, will measure the flow of working strength gel from the dilution means 350 demanded by the gel user and send a demand flow signal to the controller 60. The controller 60 will process the demand flow signal and adjust the quantity of dry polymer metered to the mixer 22 by the Acrison feeder 42, proportion the flow of water through the orifices 116 of the mixer to the quantity of polymer being metered into the polymer inlet 80, adjust the actuator 266 of the jet pump 28, and adjust the pumping rate of the metering pump 404 to satisfy the demand flow signal. Simultaneously, the controller 60 may receive the viscosity signal from the viscometer 402 and adjust the pumping rate of the metering pump 404 to maintain the preselected viscosity. As another example of automatic operation of the apparatus 20, the hydration tank 286 may include a level sensor 414 which senses the level of the gel in the hydration tank 286 and sends a level signal to the controller 60 indicative of said level. The controller 60 may use the level signal as a set point and adjust the output of the mixing means 22 (while maintaining proper proportions of polymer powder and water) to maintain a desired level in the hydration tank 286, while simultaneously using the demand flow signal from flow meter 412 to adjust the metering pump 404 to provide the gel flow rate demanded by the gel user.

The preferred controller 60 includes a sequenced control of the start-up and shutdown of the apparatus 20. During start-up the controller 60 will first start pump 268 and open the orifice 246 of the jet pump 242 to begin injecting water into conduit 254. The controller 60 will then monitor the conduit 254, using flow or pressure sensors, for the presence of water flow or water pressure from the jet pump in conduit 254. Once this condition is met, the controller 60 will start pump 95 and adjust valve plate 118, using actuator 145, to initiate water flow through the mixing means 22. The controller 60 will use pressure sensors or flow sensors to sense the presence of water pressure or flow from the outlet 86 of the mixer 22. Once this condition is met, the controller will start motor 54 and open the flap valve 70 using actuator 72 to begin metering polymer powder into the axial flow mixer. Once the apparatus 20 is in operation, the controller 60 will continue to monitor the discharge of the mixer 22 and jet pump 28 and will shut the apparatus down in reverse sequence if pressure and/or flow is lost, i.e., the controller 60 will first stop the feeder motor 54 and close flap valve 70; then stop pump 95 and the flow of water through the mixer 22; and then stop pump 268 and the flow of water through the jet pump 28. The controller 60 may also monitor other functions such as the operation of the metering pump 404, dilution means 350, water pumps 95, 268, 420, transducers 58, 405, as well as the other sensors and actuators, and shut down the system any time it receives an abnormal signal, as would be known to one skilled in the art in view of the disclosure contained herein.

The water supply 98 will include a connection, such as a water manifold (not illustrated), for connecting the apparatus 20 to a source of water. Water supply pump 420, in the prototype apparatus 20, takes the water from the water supply 98 and pumps it to a pressure of approximately 30 psig. From the water supply pump 420, the water is supplied directly to the water inlet 354 of dilution means 350 through water supply line 422. Pump 95 is connected to water supply line 422 to increase the water pressure to approximately 120–140 psig for use by the mixing means 22. Pump 268 is connected to the water supply line 422 to increase the water pressure to approximately 60 psig for use by the jet pump 28. Additives, such as buffering agents, breakers, and other chemicals, may be injected into the water supply system at appropriate points, as would be known to one skilled in the art in view of the disclosure contained herein. For example, buffering agents would normally be injected into the water to the mixer 22, as would other chemicals or agents which affect hydration. Chemicals and agents which do not affect hydration may be added to the water to the jet pump 28, the water to the dilution means 270, or may be injected into the centrifugal diffuser 24, e.g., a tangential inlet (not illustrated) for the additives may be added to the inner chamber 282 of the diffuser 24.

The method of hydrating a particulated polymer and producing a gel, such as a well treatment gel, includes the steps of mixing the polymer with a water spray and forming a water-polymer mixture having a motive energy; centrifugally diffusing the motive energy of the mixture; and hydrating the mixture into a gel. The mixing step includes spraying the polymer with water at a substantially constant water velocity and with a substantially constant water spray pattern at all flow rates of the water. Referring to FIGS. 3–9, the mixing step further includes providing the polymer to a polymer inlet 80 of a water spraying mixer 22 and directing the polymer along a flow axis 140 from the polymer inlet 80 through a mixing chamber 84 to an outlet 86 of the mixer 22; surrounding the flow axis 140 and mixing chamber 84 with a water inlet 82 having a plurality of water spraying orifices 172; and opening or closing all of the orifices 172 simultaneously to regulate the flow rate and velocity of the water spray. The method provides for directing the axes 174 of the orifices 172 and the water sprayed therefrom obliquely towards the outlet 86 and the flow axis 140 and tangentially to a radial arc 176 about the flow axis 140 in order to create a converging and crisscrossing water spray pattern having several focal points along the flow axis 140. The method provides for directing the longitudinal axes 174 of the orifices 172 toward the flow axis 140 at various oblique angles and tangentially at various radial distances from the flow axis 140. The method further provides for locating the orifices 172 in opposed pairs on opposing sides of the mixing chamber 84 and directing the axes 174 of the orifices 172 of each opposed pair at the same oblique angle toward the flow axis 140 and along parallel tangents having the same radial distance from the flow axis 140.

The method also provides for metering a preselected quantity of polymer to the polymer inlet 80 of the mixer 22 and automatically regulating the size of the orifices 172 to provide a flow rate of water in preselected proportion to the metered quantity of polymer.

The method further provides for separating air from the water-polymer mixture formed in the mixing step and discharged from the outlet 86 of the mixer 22 and pumping the water-polymer mixture to impart motive energy to the mixture. The separating air step provides for centrifugally separating air from the mixture while providing a substantially unrestricted flow path for the mixture and the air separated therefrom. The centrifugally separating step is further defined as creating a suction which pulls the polymer into the polymer inlet 80 and into the water spray.

The method further provides for locating a polymer supply 40 at a lower elevation than the polymer inlet 80 and connecting a conduit between the polymer supply 40 and the polymer inlet 80.

The method further provides for pumping the water-polymer mixture from which air has been separated by injecting water into the mixture at a substantially constant velocity at all flow rates of the mixture in order to impart a motive energy to the mixture.

Referring to the example of FIGS. 10–15, the centrifugally diffusing step includes directing the mixture into a circumferential flow path around an inside surface 294 of an outside wall 292 of an inner chamber 282 beginning at an upper end 288 of the inner chamber 282 and discharging the mixture from a lower end 290 of the inner chamber 282; and directing the discharged mixture from the inner chamber 282 into a lower end 322 of an outer chamber 284 so that the mixture flows upwardly from the lower end 322 of the outer chamber 284 to an upper end 320 of the outer chamber 284. The method provides for guiding the circumferential flowing mixture out of the inner chamber 282 so that the mixture flows circumferentially around the inside surface 326 of an outside wall 324 of the outer chamber 284. The method provides for discharging the mixture from the upper end 320 of the outer chamber 284 into a hydration tank 286 in order to hydrate the diffused mixture into a gel. The method also provides for discharging the mixture from a plurality of outlets 298 at the lower end 290 of the inner chamber 282 so that the mixture flows centrifugally from the inner chamber 282, around the inside surface 326 of the outer chamber's outside wall 324 into the hydration tank 286. The method provides for supporting the inner and outer chambers 282, 284 above a floor 340 of the hydration tank 286 and discharging the gel from the hydration tank 286 through an outlet 344 in the floor 340 with the outlet being located below the inner and outer chambers 282, 284.

The method further provides for mixing water with the hydrated gel to produce a diluted gel. The mixing water step further provides for flowing the hydrated gel to a gel user; providing a water supply 98 at a higher pressure than the flowing gel; and injecting the water into the flowing gel at a substantially constant differential pressure between the water and the gel in order to provide a substantially constant specific mixing energy at all flow rates of the gel, i.e., a constant mixing energy per unit mass of gel throughput. The method provides for injecting water into the flowing gel at an injection angle about perpendicular to the flow direction of the gel.

The method further provides for measuring the viscosity of the diluted gel and producing a viscosity signal; and adjusting the flow rate of the undiluted hydrated gel in response to the viscosity signal in order to adjust the viscosity of the diluted gel. The method provides for comparing the viscosity signal to a set point signal indicative of a desired viscosity of the diluted gel and generating a control signal indicative of the flow rate of the undiluted gel to be diluted necessary to achieve the desired viscosity; and pumping a correlating flow rate of the undiluted hydrated gel.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Method of hydrating a particulated polymer and producing a gel, such as a well treatment gel, comprising:
   spraying the polymer with a directed water spray and forming a water-polymer mixture having a motive energy;
   passively directing the motive energy into circular motion, thereby centrifugally separating and discharging air from the mixture and centrifugally diffusing the motive energy of the mixture; and
   hydrating the mixture into a gel.

2. Method of claim 1 in which the mixing step comprises:
   spraying the polymer with water at a substantially constant water velocity and with a substantially constant water spray pattern at all flow rates of the water.

3. Method of claim 2 in which the mixing step comprises:
   providing the polymer to a polymer inlet of a water spraying mixer and directing the polymer along a flow axis from the polymer inlet through a mixing chamber to an outlet of the mixer;
   surrounding the flow axis and mixing chamber with a water inlet having a plurality of water spraying orifices; and
   opening or closing all of the orifices simultaneously to regulate the flow rate and velocity of the water spray.

4. Method of claim 3, comprising:
   directing the axes of the orifices and the water sprayed therefrom obliquely towards the outlet and the flow axis and tangentially to a radial arc about the flow axis in order to create a converging and crisscrossing water spray pattern having several focal points along the flow axis.

5. Method of claim 4, comprising:
   directing the axes of the orifices toward the flow axis at various oblique angles and tangentially at various radial distances from the flow axis.

6. Method of claim 5, comprising:
   locating the orifices in opposed pairs on opposing sides of the mixing chamber and directing the axes of the orifices of each opposed pair at the same oblique angle toward the flow axis and along parallel tangents having the same radial distance from the flow axis.

7. Method of claim 3, comprising:
   metering a preselected quantity of polymer to the polymer inlet of the mixer; and
   automatically regulating the size of the orifices to provide a flow rate of water in preselected proportion to the metered quantity of polymer.

8. Method of claim 1, comprising:
   separating air from the water-polymer mixture formed in the mixing step; and
   pumping the separated water-polymer mixture to impart motive energy to the mixture.

9. Method of claim 8 in which the separating step comprises:
   passively directing the water-polymer mixture into circular motion and centrifugally separating air from the mixture while providing a substantially unrestricted flow path for the mixture and the air separated therefrom.

10. Method of claim 1:
   wherein the centrifugally separating step is further defined as creating a suction which pulls the polymer into a polymer inlet to the water spray.

11. Method of claim 10 comprising the steps of:
   locating a polymer supply at a lower elevation than the polymer inlet; and
   connecting a conduit between the polymer supply and the polymer inlet.

12. Method of claim 1 in which the pumping step comprises:
   injecting water into the mixture at a substantially constant velocity at all flow rates of the mixture.

13. Method of claim 1 in which the diffusing step comprises:
   directing the mixture into a circumferential flow path around an inside surface of an outside wall of an inner chamber beginning at an upper end of the inner chamber and discharging the mixture from a lower end of the chamber; and
   directing the discharge mixture into a lower end of an outer chamber so that the mixture flows upwardly from the lower end of the outer chamber to an upper end of the outer chamber.

14. Method of claim 13, comprising:
   guiding the circumferentially flowing mixture out of the inner chamber so that the mixture flows circumferentially around the inside surface of an outside wall of the outer chamber.

15. Method of claim 13, comprising:
discharging the mixture from the upper end of the outer chamber into a hydration tank in order to hydrate the diffused mixture into a gel.

16. Method of claim 15, comprising:
discharging the mixture from a plurality of outlets at the lower end of the inner chamber so that the mixture flows centrifugally from the inner chamber, around the inside surface of the outer chamber's outside wall, and over the outer chamber's outside wall into the hydration tank.

17. Method of claim 16, comprising:
supporting the inner and outer chambers above a floor of the hydration tank; and
discharging the gel from the hydration tank through an outlet in the floor, the outlet being located below the inner and outer chambers.

18. Method of claim 1, comprising:
mixing water with the hydrated gel to produce a diluted gel.

19. Method of claim 18, comprising:
flowing the hydrated gel to a gel user;
providing a water supply at a higher pressure than the flowing gel; and
injecting the water into the flowing gel at a substantially constant differential pressure between the water and the gel in order to provide a substantially constant mixing energy at all flow rates of the gel.

20. Method of claim 19, comprising:
injecting the water into the gel at an injection angle about perpendicular to the flow direction of the gel.

21. Method of claim 19, comprising:
measuring the viscosity of the diluted gel and producing a viscosity signal; and
adjusting the flow rate of the undiluted hydrated gel in response to the viscosity signal in order to adjust the viscosity of the diluted gel.

22. Method of claim 21, comprising:
comparing the viscosity signal to a setpoint signal indicative of the desired viscosity of the diluted gel and generating a control signal indicative of the flow rate of the undiluted gel necessary to achieve the desired viscosity; and
pumping a correlating flow rate of the undiluted, hydrated gel.

23. Method of hydrating a particulated polymer and producing a gel, such as a well treatment gel, comprising:
inducting and spraying the polymer with a water spray to form a water-polymer mixture;
separating air from the water-polymer mixture;
pumping the water-polymer mixture to impart motive energy to the mixture; and
passively converting the motion of the mixture into circular motion and thereby centrifugally dissipating the motive energy of the mixture, centrifugally separating air from the mixture, and flowing the mixture in a first-fluid-in, first-fluid-out flow regime in order to hydrate the polymer into a gel.

24. Method for hydrating a particulated polymer and producing a gel, such as a well treatment gel, comprising:
inducting and spraying the polymer with a directed water spray and thereby forming a water-polymer mixture having a motive energy;
passively converting the motion of the mixture into a circular motion and thereby centrifugally separating air from the mixture and providing a flow path for the discharge of the mixture which does not significantly restrict air flow; and
pumping the centrifugally separated mixture into a hydration tank.

* * * * *